THERMOPLASTIC FILM RANDOM ACCESS ANALOG RECORDING

Filed Aug. 21, 1959 7 Sheets-Sheet 1

Inventors
William C. Hughes
John E. Wolfe
Richard J. Rieke
by I. David Blumenfeld
Their Attorney

THERMOPLASTIC FILM RANDOM ACCESS ANALOG RECORDING

Inventors
William C. Hughes
John E. Wolfe
Richard J. Rieke
by I. David Blumenfeld
Their Attorney

THERMOPLASTIC FILM RANDOM ACCESS ANALOG RECORDING

Inventors
William C. Hughes
John E. Wolfe
Richard J. Rieke
by J. David Blumenfeld
Their Attorney Inventors
William C. Hughes
John E. Wolfe
Richard J. Rieke
by I. David Blumenfeld
Their Attorney Jan. 26, 1965 W. C. HUGHES ETAL 3,167,747
THERMOPLASTIC FILM RANDOM ACCESS ANALOG RECORDING
Filed Aug. 21, 1959 7 Sheets-Sheet 5
Fig. 10
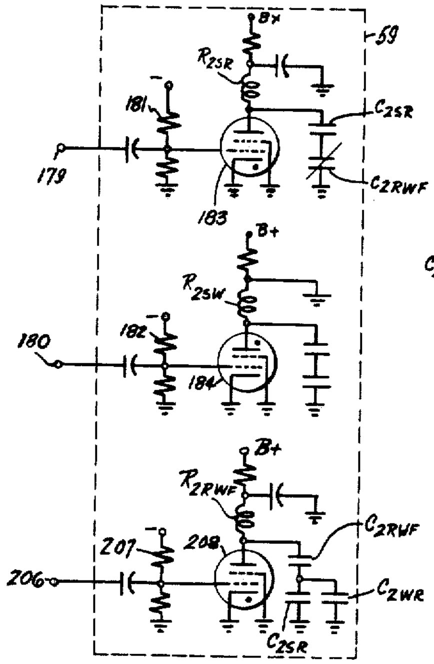
Fig. 8
Fig. 9
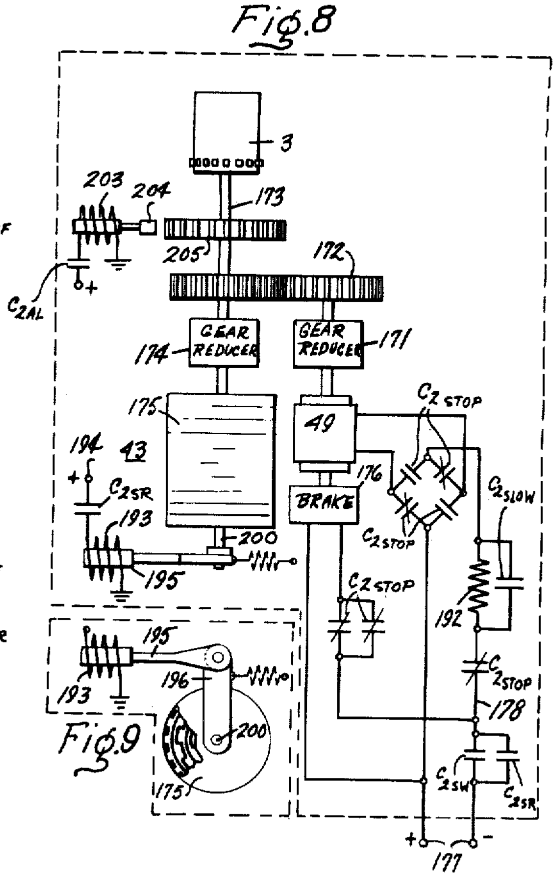
Fig. 11
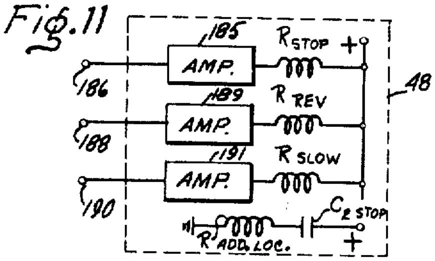
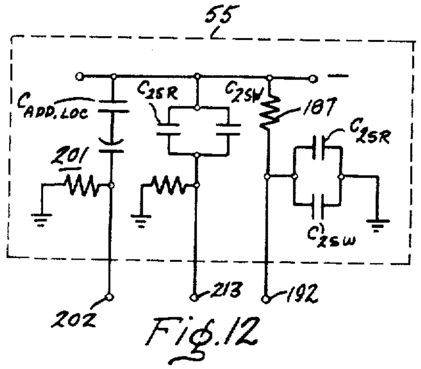
Fig. 12
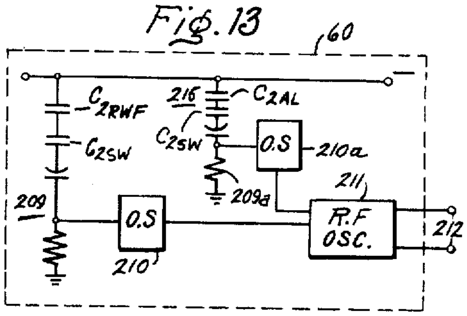
Fig. 13
Inventor
William C. Hughes
John E. Wolfe
Richard J. Rieke
by I. David Blumenfeld
Their Attorney Inventors
William C. Hughes
John E. Wolfe.
Richard J. Rieke.
by I David Blumenfeld
Their Attorney Inventors
William C. Hughes
John E. Wolfe
Richard J. Rieke
by I. David Blumenfeld
Their Attorney United States Patent Office 3,167,747
Patented Jan. 26, 1965

3,167,747
TRERMOPLASTIC FILM RANDOM ACCESS ANALOG RECORDING

William C. Hughes and John E. Wolfe, Schenectady, and Richard J. Rieke, Scotia, N.Y., assignors to General Electric Company, a corporation of New York Filed Aug. 21, 1959, Ser. No. 835,209
4 Claims. (Cl. 340—172.5)

This invention relates to a data storage system for storing analog information on a deformable thermoplastic storage medium, and more particularly to a system which provides random access to any location or "address" on the storage medium.

It has been found highly advantageous to store color as well as black and white information in the form of minute deformations on the surface of a thermoplastic storage medium. The deformations are produced by an electron writing beam depositing electrons on the surface of the thermoplastic medium in a predetermined charge pattern and then heating the thermoplastic. The electrostatic forces exerted by the electrons deform the now fluid thermoplastic to form deformations corresponding to the charge pattern which are fixed on the surface when the thermoplastic cools. When light is projected through these deformations, the light is refracted and diffracted to produce a poly or monochromatic spatial image of the information stored on the thermoplastic medium. In order to utilize a thermoplastic storage medium most efficiently to provide high storage density as well as rapid and accurate storage and retrieval of the information, a tape transport assembly having random access to any location or "address" on the storage medium is necessary.

It is, therefore, a primary object of this invention to provide a new and improved thermoplastic data storage system that provides random access to any location or "address" on the storage medium.

If analog information is to be stored on the thermoplastic medium such as might be the case where library storage, video color information storage, or radar display information storage is desired, immediate retrieval of the stored information in the form of a visible projected image of the stored information is desired.

Another object of this invention, therefore, is to provide a thermoplastic information storage system having optical readout of the stored information.

Moreover, if color information is to be stored with maximum efficiency and effectiveness in the form of deformations corresponding to three primary colors; e.g., red, green, and blue, the deformation or gratings should be so fashioned that interference between the respective color components due to beat gratings resulting from the presence of a plurality of superimposed gratings is avoided. One preferred method for avoiding these interference effects is to store the three color information in the form of orthogonally arranged diffraction gratings.

A further object of this invention is to provide a random access thermoplastic storage system wherein color information is stored on the thermoplastic storage medium in the form of orthogonally arranged diffraction gratings.

Other objects and advantages of the invention will become apparent as the description thereof proceeds.

In accordance with the invention the foregoing objects are accomplished by providing a thermoplastic storage medium which may be selectively positioned, in response to external position or "address" information, at an electron beam writing station to store color information in the form of orthogonal grating structures or a readout station to retrieve the stored information by projecting light through the grating structure to produce image of the stored information. To provide random access to any location or "address" on the thermoplastic storage medium both for storage and retrieval purposes, a transport mechanism is provided which is actuated to position the storage medium by continuously comparing the actual position of the storage medium with the desired "address" and driving the transport mechanism in response to their difference until the storage medium is positioned at the desired "address" or location.

The novel features characteristic of this invention are set forth in the appended claims. The invention itself, however, together with further objects and advantages thereof, may best be understood by reference to the following description, taken in connection with the accompanying drawings, in which:

FIGURE 8 is a schematic illustration of the tape transport motor energizing circuit;

FIGURE 9 is an elevational view of a portion of the motor energizing circuit of FIGURE 8;

FIGURES 10–13 are circuit diagrams of a number of control circuits for the circuit of FIGURE 1;

FIGURE 14 is a block diagram of the address register circuits for controlling the transport mechanism;

Before proceeding with a discussion of the various figures of the drawings and a description of the invention a glossary of the various terms and definitions as utilized in this specification will be useful.

*Analog*—Any manifestation or representation of numbers represented by directly measurable quantities such as voltages, resistances, rotations, etc.

*Digital Signal*—A number or manifestation which can assume only discrete values.

*Binary Signal*—Any manifestation, usually an electrical voltage, having two different possible states, one of which may be used to represent a 0 and the other a 1, and the presence and absence of a signal corresponds to a 1 or a 0, respectively.

*Random Access System*—A system wherein the location of any item of information on a storage element may be chosen at random and access to any such location may be obtained with equal facility.

*Logical "AND" Circuit*—A circuit having two or more inputs so designed that an output signal is produced when, and only when, input signals are received simultaneously at all inputs.

*Logical "OR" Circuit*—A circuit having two or more inputs so designed that an output signal is produced when an input signal is received at any of the inputs or at all of them.

*One Shot*—A circuit having one stable state and so designed that the circuit is normally in the stable state until the application of an input signal reverses its state; after the application of a signal causes a reversal of state the circuit returns to the original stable state and remains there until the application of another input signal.

*Flip Flop*—A circuit having two stable states so that the circuit as a whole remains in one of its two stable states until the application of an input signal changes it to the other.

Figure 1:
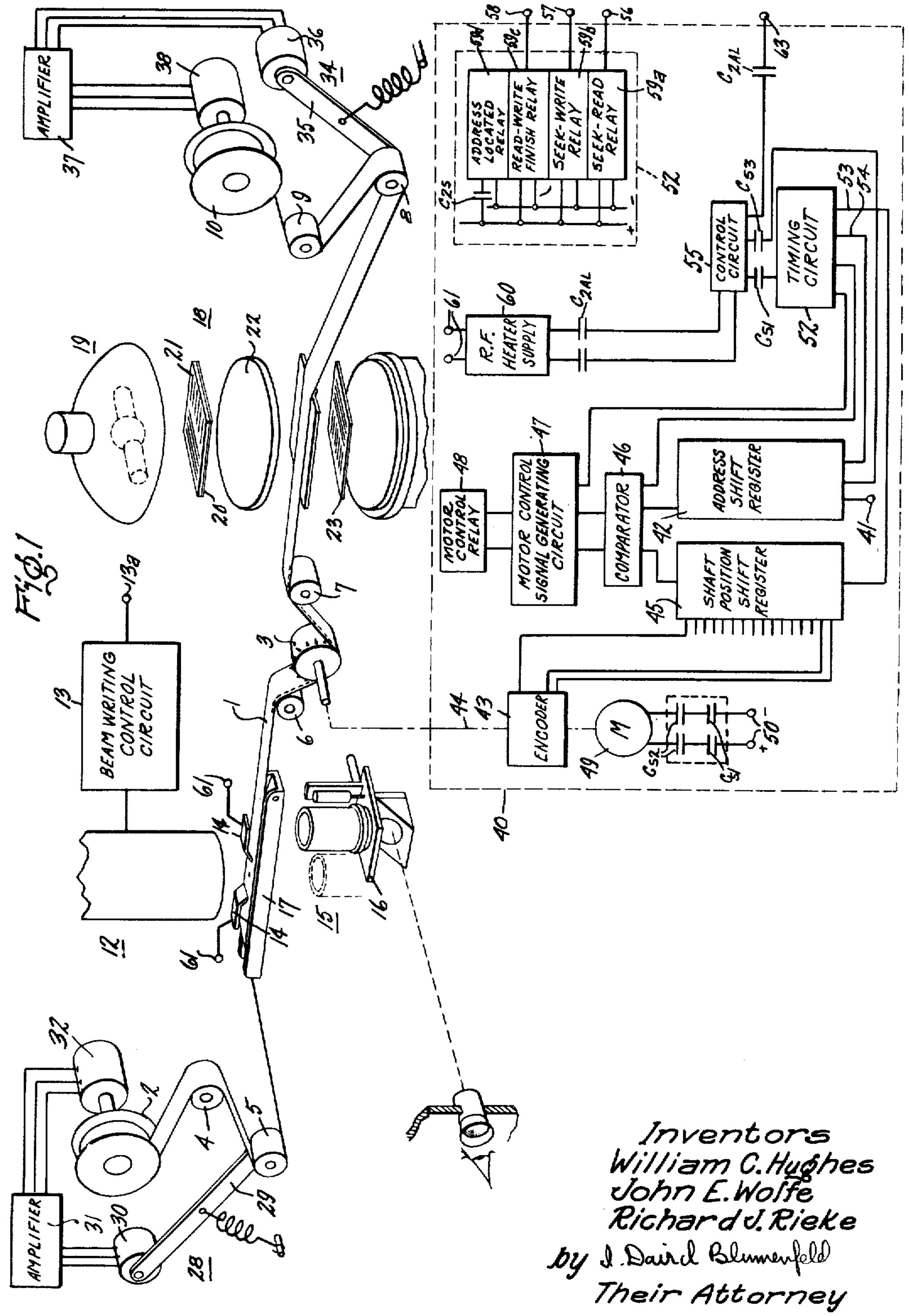
FIGURE 1 is a schematic illustration of the random access thermoplastic storage system of the instant invention.

Referring now to FIGURE 1 of the accompanying drawings, a system for storing analog color information on a thermoplastic tape storage element 1 is illustrated diagrammatically. Thermoplastic tape 1 is fed from a supply reel 2 to various portions of the system onto a take-up storage reel 10 by tape transport mechanism which includes a tape sprocket drive wheel 3, and the idler pulleys 4, 5, 6, 7, 8 and 9. The tape in traversing the system passes through a writing station at which color information received from an external circuit such as a computer or a color video camera is stored as minute surface deformations formed as an orthogonal grating structure. The orthogonal grating structure stores color information in the form of a three component color system comprising a mixture of primary colors, red, blue and green, in the proper proportions. The precise configuration of the orthogonal grating structures on the thermoplastic tape, and the manner in which the color images are produced will be discussed more fully later in connection with a more detailed description of the writing and readout assemblies of the instant apparatus.

Briefly speaking, however, the minute deformations are produced on the surface of the thermoplastic film by first depositing electrons on the surface to form an electrostatic charge pattern of grid-like shape, the parameters of which correspond to the color input information to be stored. The thermoplastic is then heated so that the electrostatic charge pattern deforms the surface to produce a grating structure on the surface. To this end, an electron beam writer assembly 12 is provided which includes a finely focussed beam of electrons controlled from a writing control circuit 13 to produce the desired charge pattern on the surface of the thermoplastic. The control circuit 13 is supplied at its input terminal **13*a*** with color information from an external circuit such as a video circuit or a computer and translates these color information input signals to control voltages which position the electron beam in the desired manner to produce the charge pattern on the surface of the thermoplastic.

Positioned adjacent to the thermoplastic are a pair of radio frequency heating electrodes 14 which are periodically energized to supply radio frequency heating energy to the tape for the purpose of heating it and producing the desired deformations.

Positioned beneath the tape 1 at the writing position 11 is a monitoring assembly 15 which may be utilized from time to time to observe the shape of the electron writing beam in the writer 12 prior to writing on the tape so that the electron beam may be accurately focussed.

The monitoring element 15 is supported on a movable carriage 16 which is located beneath a tape guide 17. The tape guide 17 is pivoted at one end and is rotated downwardly to permit the carriage 16 to move the monitor 15 into alignment with the beam writing assembly 12 so that the operator may view the beam configuration. The writing beam may then be adjusted manually to control the focus and shape.

A readout station 18 for retrieving the stored color information includes an optical system for projecting light through the deformations on the thermoplastic to produce a colored spatial image therefrom. The optical system 18 comprises a light source 19, a filter 20 which transmits the light from the source in such a manner that two separate and distinct beams are produced one of which includes all wavelengths of visible light except the green and the other only the green wavelengths of the spectrum. These two separate light beams are transmitted through a mask 21 which includes an orthogonal apertured grid structure one of which transmits the green light and the other of which transmits the light containing all wavelengths in the visible spectrum except the green. The light emanating from the mask 21 is projected by a lens 22 through the thermoplastic 1 and onto a second mask 23 having an orthogonal grid structure so related to that of the mask 21 that in the absence of any deformations on the thermoplastic tape the light transmitted through the apertures of mask 21 is intercepted by the opaque portions of the mask 23 so that no light is transmitted to the objective lens 24 onto a viewing screen, not shown. Deformations on the thermoplastic 1 diffract a portion of the light so that red and blue are transmitted through one set of apertures of mask 23 while simultaneously refracting the green light through the other apertures to produce the desired output color image.

In driving the tape 1 to the writing or readout stations, it is highly desirable to maintain the tape tension constant. To this end, the supply and takeup reels are provided with tape tension adjusting systems 28 and 34 to maintain the tape at a fixed predetermined tension. The supply reel tape tension adjusting system 28 includes a spring biased tape tension control arm 29 which supports the idler pulley wheel 5. The arm 29 is pivoted at its other end and drives to the rotor of a selsyn 30 to produce a three phase output signal whenever the tape tension varies sufficiently to change the position of the arm 29. The output from the selsyn 30 is coupled to the input of an amplifier 31 which drives a three phase reel motor 32. That is, with the proper tension on the tape 1 the arm 29 is so positioned that the selsyn rotor is in its null position and the output is zero. Hence, the motor 32 is de-energized and the reel 2 is immobilized. In the event that the tension on the tape becomes greater than a predetermined value, such as might be the case when drive wheel 3 moves the tape to the right, the force on the arm 29 rotates it counter clockwise about its pivot against the action of its associated spring. Rotation of arm 29 moves the rotor of the selsyn 30 sufficiently to produce an output signal which is applied to the amplifier 31 and then to the motor 32 causing it to rotate the reel 2 in a counter clockwise direction to supply sufficient tape to reduce the tension and permitting the arm 29 to return to its neutral position.

In the event that the tension becomes too low and the tape becomes slack, the action of the spring rotates arm 29 about its pivot in a clockwise direction so positioning the rotor of the selsyn 30 that the motor 32 rotates the reel in a clockwise direction reeling in enough of the tape to apply the proper tension.

In a similar manner, the take-up reel 10 is also provided with a similar tape tensioning control system which includes a spring biased tape tensioning control arm 35 having the idler pulley wheel 8 rigidly secured thereto at one end and pivoted at its opposite end. Rotation of arm 35 moves the rotor of a second selsyn 36 the output of which is coupled through an amplifier 37 to a three phase motor 38 which drives the take-up reel 10 in the manner previously described to maintain the tension at the desired predetermined value. The two tension control systems 28 and 34 function, as can be seen by observation, in such a manner that if the tension in the tape is too great on the supply side causing its associated reel 2 to supply more tape and reduce the tension, take-up reel 10 will be driven to take up sufficient tape to produce the desired tension. Similarly, if the tension on the take-up reel side is too large the take-up reel is driven to supply tape and reduce the tension while the supply reel 2 is driven to take up tape. Tape tensioning systems 28 and 34 illustrated diagrammatically in FIGURE 1 and described briefly above, are described in greater detail in our copending application S. N. 835,210 (14D–1361) filed concurrently herewith on August 21, 1959, and assigned to the General Electric Company, the assignee of the instant invention.

The tape transport mechanism through the medium of the sprocket drive wheel 3, the associated idler pulleys and the supply and take-up reels, drive the tape 1 in either direction in such a manner that selected portions, chosen at random in response to conditions in an external circuit, may be positioned either at the writing station 12 or at the readout station 18. That is, a random access system is provided wherein the "addresses" or locations of items of information stored on the tape 1 may be chosen at random, and access to any such location on the thermoplastic tape can be obtained in a relatively short time and with approximately equal facility. Similarly, not only is random access desired to retrieve or read out stored information, but random access to any location or "address" is also desired for the purpose of writing or storing the information.

To provide random access to any location on the tape, a random access address circuit 40 is provided which actuates the tape transport mechanism and drives the tape to any desired location or "address." Address information defining the desired location on the tape is supplied from an external circuit such as a computer or temporary storage medium to the address circuit 40 in the form of a 14 digit serial address input pulse train. This 14 digit serial address is supplied to the input terminals 41 of a serial entry, serial readout shift register 42 where it is stored temporarily until it is utilized to actuate the tape transport mechanism to position the tape. Shift registers of the type are well known to those skilled in the art and reference is hereby made to Chapter 13 of High Speed Computing Devices, Engineering Research Associates, Inc., McGraw-Hill (1950), New York and particularly pages 297–300 for a complete description of the construction and manner of operation of such a register.

At this stage it is sufficient to state that a shift register consists of a number of binary storage elements or stages so inter-connected that application of advance or shift pulses steps all the information in the register one stage forward. This transfers the digit stored in any stage R into stage R+1. The digit stored in the last stage N goes out of the register into the utilization circuit, whereas the first stage is left in a state ready to accept new information. Hence, information is fed serially into the register by alternately stepping the register and writing into first stage until the entire 14 digit address entry is stored.

Simultaneously a shaft position encoding device 43, mounted on the tape wheel drive shaft 44 supplies shaft position information in the form of another 14 digit parallel address input to a second shift register 45 where it is stored. The shaft position encoding device 4 3 consists broadly of a number of coded discs, each including a plurality of coded tracks and associated commutating brushes so that the position of the respective brushes along the coded tracks produce electrical outputs in digital form which are representative of the shaft position. In the particular coding device utilized in applicant's system, a sufficient number of discs are utilized to provide 14 coded tracks whereby the output information is in the form of the desired 14 digits referred to above.

The shift register 45 which receives the shaft position information from the coder 43, unlike shift register 42 is of a parallel entry serial readout type which is characterized by the fact that the 14 digit pulse output from encoder 43 is applied simultaneously, rather than serially, to the various stages of the register. The information thus stored in register 45 is then read out serially by the application of advance or shift pulses to the register.

The outputs from the shift registers 42 and 45 are applied to a comparison circuit 46 of the serial subtractor type which carries out the arithmetic operation of subtracting the digital information in the two shift registers. Hence, the comparison circuit 46 produces a digital output which represents the difference, in digital form, between the desired "address" information from the external circuit and the actual position of the tape at any time as represented by the shaft position information.

The output digital signals from the comparison circuit 46 are fed to a motor control signal generating circuit 47 which produces output control signals for a plurality of motor control relays, illustrated generally in block diagram form at 48, which relays in turn control the energization, speed, and direction of rotation of a tape drive motor 49. The motor control relays in the circuit 48 control the application of energizing voltage to the motor 49 from a source of energizing voltage supplied to the terminals 50, by controlling the closure of a bank of relay contacts illustrated at 51.

It will be appreciated that during the period that the address information is being supplied from the external circuit to the input terminal 41 of shift register 42, the tape drive sprocket wheel 3 and the drive sprocket wheel motor 49 must be disabled to prevent movement of the tape until the entire address information has been stored in the shift register assembly. To this end, a timing circuit 52 is provided which includes a clock pulse generator which supplies advance or shift pulses to two shift registers via the leads 53 and 54, to initiate transfer of the information stored in the two shift registers to the comparison circuit 46. Timing circuit 52 is disabled during the period when the address information is being entered into the shift register. However, upon termination of the address information storage period, an enabling SEEK command pulse is supplied from a control circuit 55 enabling the timing circuit 52 and initiating operation of the tape transport mechanism.

Thus, after the 14 digit address information from the external circuit has been entered in the shift register 42, a command signal from the external circuit is supplied to one of the input terminals 56, 57 and 58 of a relay control circuit $R_2$, illustrated in block diagram form at 59. The appearance of a command signal at one of the terminals operates an associated relay which energizes selected signal generating means in the control circuit 55 to provide a SEEK signal to the timing circuit 52. The timing circuit then supplies "shift" pulses to the two registers, shifting information out of the registers to the comparison circuit producing output signals which drive the motor and tape drive sprocket wheel until the tape is properly positioned.

The relay control circuit 59 shown in block diagram form comprises four relay sections *59a*, *59b*, *59c*, and *59d*. The relay section *59a* receives a SEEK-READ command signal from the external circuit at its input terminal 56 to energize its associated relay and initiate movement of the tape to position the information at a predetermined location on the tape underneath the optical system for purposes of retrieval. A corresponding relay circuit *59b* responds to a SEEK-WRITE command signal from the external circuit at its input terminal 57 to position any selected location on the tape beneath the electron beam writer 12. In addition, a READ-WHITE FINISH control relay circuit *59c* is provided which is energized, in response to a signal at its input terminal 58, from the external circuit to indicate that the operation is terminated, and to de-energize the relay circuits *59a* and *59b* and energize the RF heater circuit 60. An ADDRESS-LOCATED relay circuit *59d* is also provided which functions as an energizing means in the control signal circuit 55 to produce an output signal indicating the fact whenever the tape has been properly positioned. This output signal is supplied to the external circuit to indicate that the tape transport mechanism has done its work.

Upon the appearance, for example, of a SEEK-WRITE command pulse from the external circuit, a relay in circuit *56b* is energized, closing the contact $C_{S1}$ in the output of control circuit 55 and supplying a SEEK signal to the timing circuit 52. The SEEK signal energizes the timing circuit, and clock pulses are supplied to the shift registers 42 and 45. The energization of the SEEK-WRITE relay circuit *56b* also closes the contact $C_{S2}$ in the supply circuit of the motor 49 and contact $C_{S3}$ in the output of control circuit 55 to supply an ADDRESS-LOCKOUT signal to the shift register 42. The ADDRESS-LOCKOUT signal prevents shift register 42 from receiving further address information from the external circuit until all of the information has been read out and the tape is properly positioned. With the closure of the various contacts and energization of the timing circuit, the comparison circuit 46 receives and compares the address information in the shift register 42 and the shaft position information in the register 45. The resulting output signals are supplied to the motor control signal generating circuit 47 which in turn energizes the relays in the relay control circuit 48, closing the motor control contacts $C_1$, and applying energizing voltage to the motor.

As the motor 49 rotates, driving the tape in one direction or the other, the digital output from the encoder 43 supplied to the shift register 45 changes, reflecting the new shaft position. This new shaft position information is again compared with the address information and the procedure repeated until the digital information in the shift register 45 is the same as the address information in the register 42, at which time the outputs from the comparison circuit 46 and the motor control signal circuit 47 go to zero, de-energizing the relay circuits 48 and the motor 49 and stopping movement of the tape. Whenever the output signals from the motor control signal generating circuit 47 goes to zero, a relay in the relay control circuit 48 becomes energized, closing a contact $C_S$ connected between power source 62 and an Address-Located relay circuit **59*d*, energizing the relay and closing the contact $C_{AL}$ in the output of the control signal circuit 55. Upon closure of contact $C_{AL}$ an ADDRESS-LOCATED output signal is supplied to the output terminal 63** and thence to the external circuit, indicating that the predetermined location or "address" on the tape has been located.

When the tape 1 has been positioned at the desired "address" by the tape drive sprocket wheel 3 and the ADDRESS-LOCATED signal is transmitted to the external circuit, the color information to be stored on thermoplastic tape 1 is supplied from the external circuit to the input terminal **13*a* of beam-writing control circuit 13. The control circuit 13 provides output signals which control the electron writing beam of beam writer 12 so that a charge pattern representative of the analog color information to be stored is produced on the surface of the tape. After the desired information has been written on the tape in the form of the desired charge pattern, a READ-WRITE FINISHED signal is supplied from the external circuit to the input terminal 58 READ-WRITE FINISHED relay circuit 59*c*, energizing its relay and de-energizing the relay circuits 59*a*, 59*b*, and 59*d*, opening the contacts $C_{S1}$, $C_{S2}$, $C_{AL}$, $C_{S3}$. As a result the SEEK signal to the timing circuit 52 is removed, and clock pulses are no longer supplied to the shift registers terminating the information readout operation. Upon de-energization of the relays the ADDRESS-LOCKOUT signal is removed from the shift register 42**, conditioning it to receive more address information from the external circuit.

Concurrently, the energization of the READ-WRITE FINISHED relay circuit **59*c* closes a contact $C_{2F}$ which completes a circuit from the control signal circuit 55 to an R.F. heater supply 60, which supplies a burst of R.F. heating energy to a pair of output terminals 61 which are connected to the R.F. heater electrodes 14** positioned directly above the thermoplastic tape at the writing station. The R.F. energy heats the thermoplastic tape, and the softened tape is deformed by the electrostatic forces exerted by the charge pattern on the surface of the thermoplastic. The resulting deformations are in the form of minute gratings which, upon having light transmitted therethrough, produce the desired spatial color pattern image.

Upon termination of the READ-WRITE FINISHED signal from the external circuit, the READ-WRITE finish relay **59*c* is de-energized and the contacts $C_{2F}$ are opened. As a result the R.F. heater supply 60 is disabled and R.F. heating energy is no longer supplied to the R.F. electrode 14. The thermoplastic material cools and the previously fluid deformations are frozen as permanent deformations on the surface. The entire address circuit 40** is now in condition to receive further address information from the external circuit to store information at another predetermined location or "address" on the thermoplastic film.

In describing the circuit of FIG. 1, the operational sequence for storing information on the tape by means of the electron beam writing component has been discussed. However, it will be recognized that the external circuit may also control the tape transport mechanism in order to position any given tape location or "address" in the readout position, so that the information stored therein may be retrieved by means of the optical readout system 18 illustrated in FIG. 1. The sequence of operations will be generally the same as that for the writing sequence in that the address information will be supplied to the shift register 42 in the form of a 14-digit code pulse train. The timing circuit 52 is disabled at this point so that no information is supplied to the comparison circuit 46 and the motor 49 controlling the drive wheel 3 of the tape transport mechanism is de-energized. When the address information has been entered in the shift register 42, the external circuit now provides a SEEK-READ signal to the relay section **59*a*, energizing that relay and closing the contact $C_{2S1}$ to supply a SEEK signal to the timing circuit 52, the contacts $C_{S3}$ to produce a lockout signal, and the contacts $C_{S2}$ in the motor circuit. Clock pulses from the timing circuits are then transmitted to the registers shifting information to the comparison circuit 46. The output from this circuit energizes the control circuit 47 and the relay circuit 48 closing contacts $C_1$ to energize the tape drive sprocket wheel motor 49**.

When the tape has been located at the proper "address," the output from the comparison circuits and the motor control signal circuits go to zero energizing the ADDRESS-LOCATED RELAY circuit **59*d* to produce an ADDRESS-LOCATED signal at the output of control signal circuit 55 which is supplied to the external circuit to indicate that the tape is properly positioned for the readout. The readout circuit as illustrated in FIG. 1 is continuously energized to produce a color light image which may be directly viewed. However, it should be understood that the optical system may be controlled from the external circuit in such a manner that the light source 19 is energized in response to a command signal from the external circuit after the external circuit receives an ADDRESS-LOCATED signal from the control circuit 55**.

After the information has been retrieved by the readout circuit 18, a READ-WRITE FINISH command signal is again supplied to the relay control signal circuit **59*c*, de-energizing the remaining relays, removing the SEEK signal from the timing circuit 52 and the ADDRESS-LOCKOUT signal from the shift register 42, putting the shift register section in condition for receiving further address information from the external circuit. Thus, it can be seen that the address circuit 40** controls the tape transport mechanism to position any desired location or "address" on the thermoplastic tape at either the Read or Write stations to provide highly accurate, random access, data storage system.

Having described the construction and operation of the overall random access analog information storage system in connection with FIG. 1, a detailed description will now be provided of the individual components constituting the system of FIG. 1:

TAPE TRANSPORT

Figures 2, 3:
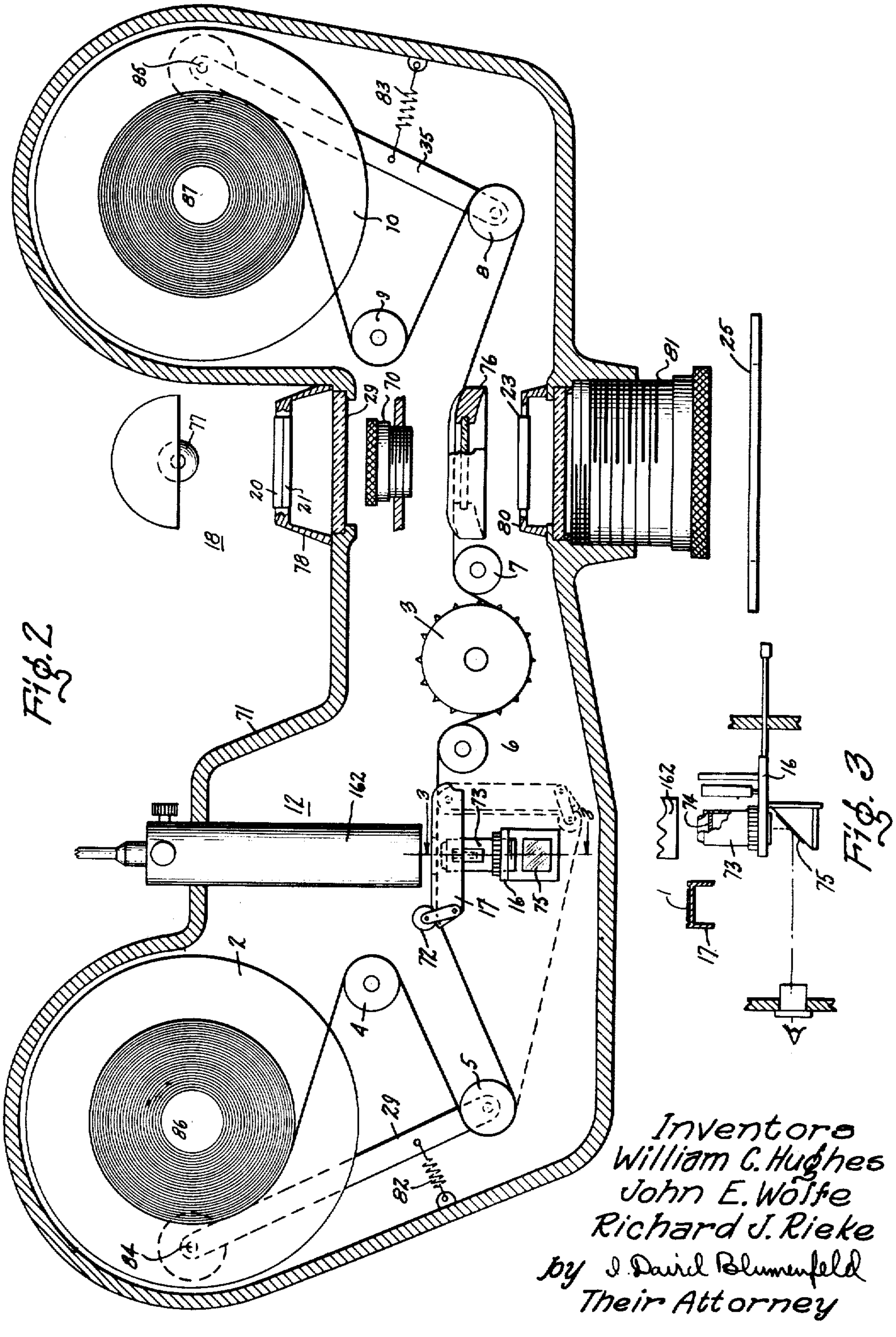
FIGURE 2 is a detailed showing of a portion of the system of FIGURE 1.
FIGURE 3 is a sectional view taken along the lines 3—3 of FIGURE 2.

Referring now to FIGURE 2 for a detailed showing of the tape transport housing assembly, a housing 71 is illustrated which is maintained under vacuum so that the thermoplastic storage tape may be directly subjected to the action of the electron beam within the housing. The thermoplastic tape is wound on the tape supply reel 2 which is also contained in the housing 71. The thermoplastic tape may be fabricated of a light transparent base of polyester film such as that sold by the DuPont Company under their tradename "Mylar." This base material must be optically clear, smooth, non-plastic at temperatures up to at least 150° C. The thickness of the base material is not critical and excellent results have been obtained from a 4 mil strip. Another suitable material for the base is an optical grade of polyethylene terphthalate sold under the tradename "Cronar." A thermoplastic film is positioned on the base member and must be optically clear, resistant to irradiation, have a substantially infinite room temperature viscosity and a relatively fluid viscosity at temperatures of 100–150° C. as well as high resistivity. One satisfactory thermoplastic material is a blend of polystyrene, m-terphenyl and a copolymer of 95 weight percent of butadiene and 5 weight percent of styrene. Specifically, the composition may be 70 percent polystyrene, 28 percent m-terphenyl, and 2 percent of the copolymer. The film is prepared by forming a 10 percent solid solution of the blend in toluene and coating the base material with the solution. The toluene is evaporated by air drying and by pumping in vacuum to produce the final composite article. The film thickness of the thermoplastic film can vary from about .01 mil to several mls, with the preferred thickness being about equal to the distance between depressions in the film.

In addition a thin layer of stannic oxide or cuprous iodide is deposited between the optically transparent base material and the thermoplastic film, which conducting film is utilized in conjunction with the RF energy from the heating electrodes to produce localized heating to soften the thermoplastic. That is, the conducting film has a circulating current induced therein when subjected to the RF energy which heats the thermoplastic material causing it to become fluid so that the electrostatic forces due to the charge pattern on its surface produce desired deformations. The conducting film of cuprous iodide, for example, may be prepared by application of a thin film of metallic copper to the surface of the optically transparent base material and then immersing the copper coated base material in an iodine vapor to form the desired cuprous iodide film. For a more detailed description of a method and apparatus of producing such a cuprous iodide film on the base material, reference is hereby made to Patent No. 2,756,165, entitled "Electrically Conducting Films and Process for Forming the Same," D. A. Lyon, issued July 24, 1956. It will be apparent to those skilled in the art, however, that the conducting film may be prepared by many well known processes and that the specific process referred to above is not to be considered limiting and is by way of illustration only.

Also positioned within housing 71 is the take-up reel 10 for the thermoplastic tape. The tape passes over a plurality of idler wheels 4, 5, 6, 7, 8, and 9 and is driven by means of a tape drive sprocket wheel 3 which is actuated from an external drive circuit. A movable tape guide 17 is positioned on one side of the sprocket drive wheel 3 and provides a guide track to position the tape at the writing station 12 directly beneath a beam writer assembly 162. The beam writer assembly 162 is secured to and extends through the housing 71 and contains an electron beam source which is controlled to form a writing beam for depositing the desired charge pattern on the surface of the thermoplastic positioned in the tape guide 17.

The tape guide 17 is pivotally secured to the housing and may be rotated from time to time to move it into the position illustrated by the dashed lines. Whenever the guide 17 is moved into this position a tape retaining roller 72 mounted on the guide also prevents the tape from sliding out of the guide and pulls it downward away from the writer assembly 162. The tape guide is moved into this downward position to permit a beam monitor assembly 15 to be aligned with the electron beam to observe its characteristics such as shape, current distribution, etc. The monitoring assembly 15, as may be seen most clearly in FIGURE 3 comprises a housing 73 mounted on the carriage 16 which is movable in and out of the paper to align the housing with the electron beam. Positioned in the upper portion of the housing 16 is a fluorescent plate 74 which is struck by the electron beam and produces a visible image thereof which may be viewed from the exterior of the housing with the aid of a 45° mirror 75. The image produced by the impinging beam is utilized to control the shape and focussing of the electron beam by adjusting the operating potentials to produce the desired beam shape, and beam current as well as adjusting the focus of the beam in the plane of the thermoplastic tape. After the beam has been adjusted by the operator for optimum operating conditions, the monitor 15 is moved out of alignment with the electron beam and the tape guide 17 is returned to its horizontal position and the tape is then ready for information storage.

Positioned on the other side of the tape drive sprocket wheel 3 is another tape guide 76 which supports the tape in a flat horizontal position in the field of view of an optical readout station 18. The optical system 18 includes an arc source 77 mounted at the focal point of a parabolic reflector which produces a parallel beam of intense white light which is projected through a filter element 20 and a mask 21 positioned in a suitable housing 78 fastened to the outside of the housing 71. The light transmitted through the filter and the mask assembly is projected through a light transparent plate 79 mounted in an aperture in the housing 71 onto a lens mounting 70 which projects the light through the thermoplastic tape 1 and an opening in guide 76 and focusses it on a second mask 23 positioned on the interior of the housing and fastened thereto by the bracket 80. A projection lens mounted in a housing 81 threadably engaging the housing 71 projects the color image produced by the information stored on the tape bearing deformations onto a screen 25 to produce a direct visual readout.

Supply and take-up reels 1 and 10 are, as was pointed out with reference to the system of FIGURE 1, controlled to maintain the proper tension on the thermoplastic tape. To this end, the idler pulley wheels 5 and 8 are mounted on tape tension control arms 29 and 35 to produce movement thereof in either direction in response to change in tension of the tape. The arms 29 and 35 are spring biased by the spring members 82 and 83 secured to the housing 71 and are mounted on shafts 84 and 85 extending through the housing. Movement of the arms 29 and 35 in response to changes in tape tension rotate the shafts 84 and 85 which are connected to the rotors of a pair of selsyns, not shown, to provide an error signal which is utilized to energize the motor driving shafts 86 and 87 which support the supply and take-up reels. The precise manner in which this is achieved has been explained in detail with reference to the system of FIGURE 1 and hence will not be repeated here.

BEAM WRITING ASSEMBLY

Figures 4, 5:
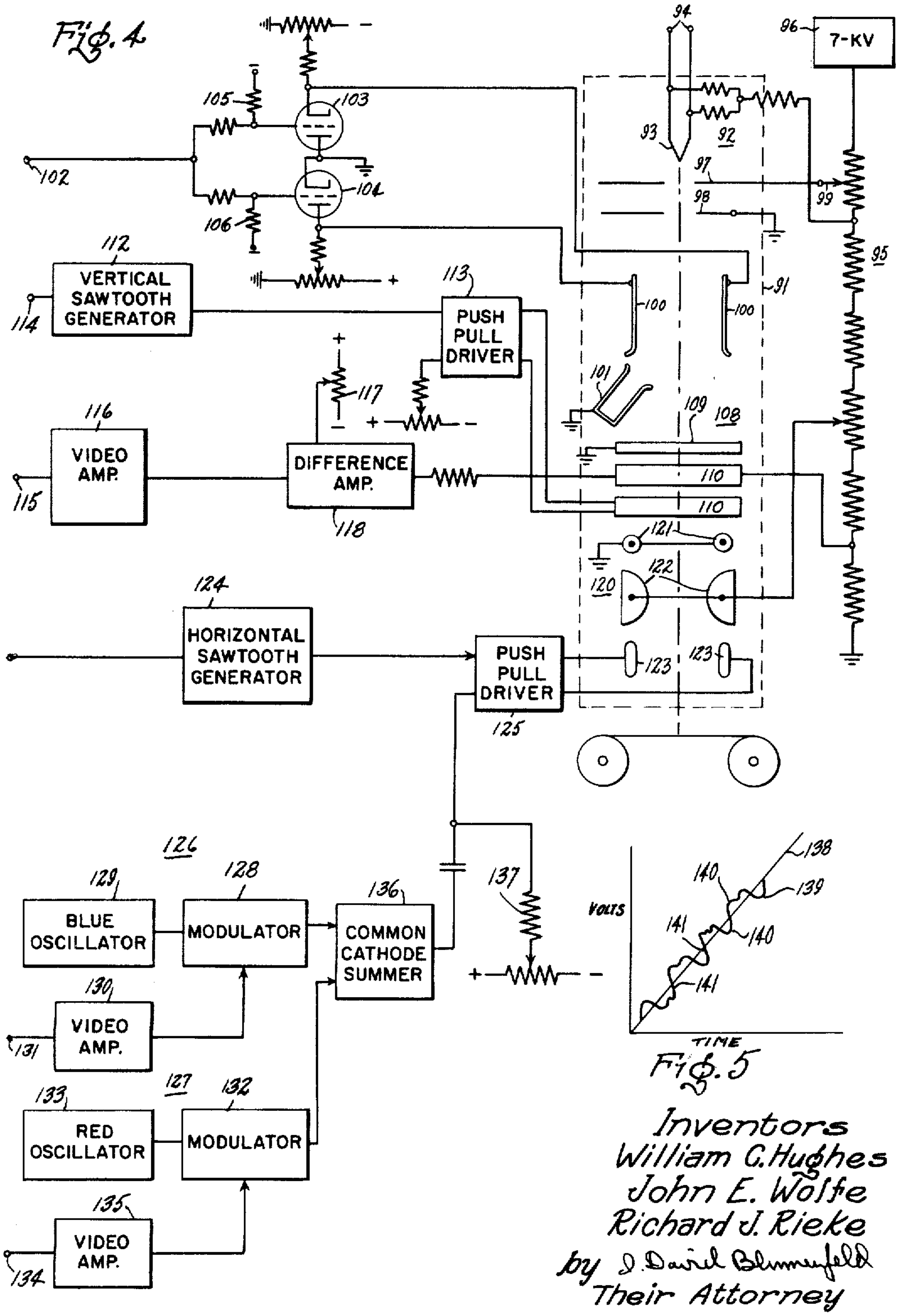
FIGURE 4 is a schematic illustration of the beam writer and beam writer control circuit of FIGURE 1.
FIGURE 5 is a graph illustrating the modulated horizontal deflection signals in the circuit of FIGURE 4.

The writing beam electron assembly is shown in detail in FIG. 4 and produces the desired electron charge pattern on the surface of the thermoplastic tape by manipulating a focussed electron beam. The writing assembly includes a housing 91 having an electron gun assembly 92 positioned at one end thereof for producing the electron writing beam. Electron gun 92 comprises a point source of electrons such as the hairpin filament 93 which is heated by a source of electrical energy, not shown, connected to the two input terminals 94 and is maintained at a highly negative potential by being connected to a voltage divider 95 one end of which is energized from a source of negative energizing potential 96. A pair of apertured control electrodes 97 and 98 are positioned above the filament 93 and shape the electrons emitted from the filament into a thin flat beam of electrons. The apertured element 97 is maintained at a potential which is negative relative to that of the filament by being connected by a movable tap 99 to a point on the voltage divider 95 which is more negative than the point to which the filament is connected. As a result the electrode 97 functions in the manner of a grid electrode to control the magnitude of the beam current. The second aperture electrode 98 is maintained at ground potential and hence is positive relative to both the filament 93 and the electrode 97 and hence acts as an accelerating electrode projecting electrons down the axis of the tube.

A pair of deflecting electrodes 100 are positioned along the beam path and deflect the electron beam toward a Faraday cage 101 to prevent the beam from striking the thermoplastic tape whenever the system is in a non-writing condition. That is, the deflection plates 100 are normally supplied with deflection voltage which deflects the beam onto the Faraday cage 101. During the writing stage an unblanking signal is supplied to an input terminal 102 and to the control electrodes of a pair of non-conducting space discharge devices such as the vacuum triodes 103 and 104. In the absence of an unblanking signal at the input terminal 102, triodes 103 and 104 are biased to cut off by virtue of the negative biasing voltage applied to their control electrodes through the resistances 105 and 106. As a result, the potential at the anode of the triode 104 is positive with respect to ground and the potential at the cathode of triode 103 is negative with respect to ground. Therefore, the electron beam is deflected toward the left and onto the Faraday cage 101. With the appearance of an unblanking signal at the terminal 102, the triodes 103 and 104 become conducting, and the potential at the anode of triode 104 drops and the potential at the cathod of the triode 103 rises. Consequently the deflection potentials on the plates 100 are such that the beam is deflected from the Faraday cage and centered along the axis of the housing 91.

Positioned along the beam path beyond the deflecting plates 100 is an adjustable focussing lens assembly 108 which is controlled in response the green video signal to focus or defocus the electron beam. The lens system 108 comprises a first pair of grounded vertically spaced bar elements 109, only one of which is illustrated, a pair of focussing bar elements 110, and a pair of bar shaped lens elements 111 which simultaneously function as deflection plates to produce deflection of the electron beam in the vertical plane. The focussing lens elements 110 are maintained at a negative potential by connnection to a point on the voltage divider 95 which is negative with respect to ground. The lens elements 111 are energized from a conventional vertical deflection generator 112 which applies a sawtooth deflection voltage through a push-pull amplifier 113 to deflect the electron beam in the vertical plane. The vertical deflection generator 112 which is of standard configuration is triggered by a sync signal applied to its input terminal 114. The sync is supplied along with the video color information to insure that the sawtooth deflection voltage is initiated in synchronism with the video color information.

The color signal, as has been briefly adverted to above, is applied to the lens elements 110 to control the electron beam traversing the lens assembly. That is, the green video signal defocusses the beam in the vertical plane by an amount depending on the magnitude of the green input signal. Thus the green signal supplied to the input terminal 115 of a video amplifier 116. The amplified green video signal from video amplifier 116 is compared to a reference green color balance voltage from a potentiometer 117 in a difference amplifier 118 where the algebraic difference of the two voltages is obtained. The video amplifier 116 and the difference amplifier 118 are conventional in nature and are hence shown in block diagram form. Since their construction and operation is conventional no further discussion of these components is believed to be warranted at this time.

In defocussing the electron beam in response green color information, the long dimension of the flat beam which is normally in the vertical direction is controlled to make the beam shorter or longer and hence control the electron density deposited on the thermoplastic tape. Thus by controlling the width of the electron beam and simultaneously deflecting it in the horizontal direction a horizontal groove is produced on the thermoplastic tape which represents the green color information. The width and depth of this horizontal groove is controlled the width of the writing beam and represents the amount of green color information. This may be grasped more clearly if the effect of an electron beam on the thermoplastic tape is considered. The beam current of the electron beam is fixed and hence the number of electrons deposited by the beam dwelling at any given position is fixed whether the cross-sectional area of the beam is large or small. Thus if a very long beam is provided the same number of electrons must be deposited over a larger area reducing the electron density which results in the formation of a fairly wide but shallow groove when the tape is heated. If, however, the beam is focussed strongly so that the vertical dimension is small, all of the electrons will be deposited over a smaller area and hence the electrostatic forces produced will produce a narrower but deeper groove. The width and depth of these grooves control the slope of the sides of the groove and this, as will be described in detail later, in turn controls the amount of green light transmitted through an appropriate mask arrangement onto the viewing area.

Positioned beyond the vertical focussing lens assembly 108 is a second lens 120 comprising a pair of bar elements 121 extending into the plane of the paper, intermediate focussing lens elements 122, and a pair of flat plates 123 which function both as lens element and as deflecting elements to deflect the electron beam in the horizontal direction in such a manner that orthogonal red and blue gratings are produced at the bottom of the horizontal green groove. Plates 123 of lens assembly 120 are energized by a complex signal including a conventional horizontal deflection signal, obtained from a deflection source 124 such as a conventional sawtooth generator. The deflection signal from the sawtooth generator 124 is added in a push-pull driver circuit 125 to a modulated sinusoidal signal representing the red and blue color components.

The red and blue modulated signal components are obtained from two modulator channels 126 and 127. In the blue color channel 126 a modulator circuit 128 amplitude modulates a sinusoidally varying signal of fixed frequency from a blue oscillator 129 in response to blue video signal applied thereto through a video amplifier 130. The blue color signal which is applied to the input terminal 131 of the video amplifier 130 may be supplied from a color video camera or any other suitable source of color information. In the red color channel 127, a modulator circuit 132 amplitude modulates a signal from a red oscillator 133 in response to a red video signal supplied to the input terminal 134 of a video amplifier 135. The red and blue modulated signals produced in the channels 126 and 127 are supplied to a summing or adding circuit 136 and converted to a push-pull formed by the push-pull driver amplifier circuit 125. The horizontal position of the scan pattern on the thermoplastic film may be adjusted by means of the centering potentiometer arrangement 137 connected in the input circuit of the push-pull driver circuit 125.

The operation of the combined lens and deflection circuit 120 may be better understood by considering the relative action of the horizontal sawtooth deflection signal and the red and blue modulating signals applied to the deflection elements 123. As the horizontal deflection voltage varies sweeping the electron beam across the tape in a horizontal direction, there is superimposed thereon a modulating voltage having two sinusoidal components of different frequencies, one frequency component being amplitude modulated in accordance with the red signal and the other being amplitude modulated in accordance with the blue signal. That is, by virtue of the summing circuit 136, the amplitude modulated oscillations from the blue oscillator 129 of frequency $f$ and the amplitude modulated oscillations from the red oscillator 133 of frequency $f_1$ are added to produce a periodic non-sinusoidal output signal which has both the red and blue frequency components and a wave form which changes with the magnitude of the red and blue video signals. This high frequency composite signal superimposed on the sawtooth sweep signal produces a velocity modulation of the electron beam as it is swept in the horizontal direction.

The velocity modulating effect of the composite modulating voltage may best be understood by reference to FIG. 5 which is a graphical illustration of the sawtooth voltage and the superimposed composite modulating voltage. In the graph of FIG. 5 signal volts are plotted along the ordinate and time along the abscissa. The horizontal sawtooth deflection signal is represented by the line 138 which varies linearly with time. Superimposed on the time varying voltage 138 is a varying voltage as represented by the curve 139, the components of which are determined by the red and blue oscillator frequencies and the shape and amplitude of which are determined by the red and blue video signals.

It can be seen from FIGURE 5 that the horizontal sweep voltage at any point in time is the sum of the sawtooth deflection voltage 138 and the composite velocity modulating voltage 139. It will be apparent from the curve 139 that in areas such as 140 the rate of change of the modulating voltage plus the sawtooth scan voltage is very small so that the deflection rate of the electron beam will be correspondingly small to produce a slower scan. In areas such as 141, for example, the rate of change of the sinusoidal modulating voltage plus the sawtooth scan voltage is large and as a result the deflection rate of the beam is correspondingly faster. Thus the electron beam sweep rate is not constant but is varied to produce alternating areas of rapid and slow sweep. It follows, therefore, that the electron charge density on the thermoplastic surface will be correspondingly varied. That is, when the deflection rate is large, the beam moves very rapidly over the thermoplastic and hence the deposited electron density is low. On the other hand, when the deflection rate is small, the beam dwells longer on a given area and the deposited electron density is high. The spacing of these alternate areas of high and low electron density is proportional to the frequency contained in the non-sinusoidal curve 139 representing the red and blue video information.

When the thermoplastic tape is heated the areas of high electron density exert large electrostatic forces on the fluid thermoplastic producing a depression the depth of which is proportional to the electron density, whereas the areas of low electron density produce relatively high areas. The magnitude and spacing of this deformation is representative of the red and blue color information and thus an optical diffraction grating structure is produced.

The spacing of the grating structure thus produced may be considered in another way in order to clarify their function and the manner of their creation. That is, the deformations in the form of the valleys and peaks may be considered as two superimposed gratings of fixed but different spacing; one a red grating having a fixed spacing representative of the red color and a depth proportional to the red color signal, and the other a blue grating having a different fixed spacing representative of the blue color and a depth proportional to the blue color signal. The resulting composite grating spacing has a non-sinusoidal wave form containing gratings of both spacings each with a magnitude proportional to the signals being recorded.

It has been pointed out above, that the red and blue gratings are produced by velocity modulating the horizontal sweep of the electron beam. Furthermore, it has also been stated that the magnitude of the green color component is controlled by focussing or defocussing the width of the electron beam in the horizontal direction. A brief description will now follow of the manner in which both of these structural factors are combined to produce a composite deformation pattern for storing color information by combining the three primary colors in the proper proportions. The green information is stored by producing on the surface of the thermoplastic a horizontally extending groove the depth and width of which is controlled by the green signal applied to the lens element 110. Thus it will be appreciated that if the control potential on this lens element is such that the vertical direction of the beam is narrowed by focussing the beam, a narrow but deep groove is produced on the surface of the thermoplastic. As the amount of the green signal decreases, the potential applied to the lens element 110 defocusses the electron beam elongating the beam in the vertical direction. The electrons are now distributed over a larger area thus producing a wider but shallower groove. As the value of the green input signal becomes progressively less, the electron beam is progressively defocussed increasing the width of the horizontal groove, until at the point where the green signal goes to zero the horizontal groove essentially disappears.

Simultaneously, the velocity modulation of the beam in the horizontal plane by the red and blue color information produces, across the bottom of the green horizontal groove, a transverse grating structure representative of the red and blue colors. Thus it can be seen, that an orthogonal grating structure is produced with the green information deformation extending in the horizontal direction and the red and blue color information extending in the vertical direction. Each of these deformations are then utilized to produce the desired color image by projecting light therethrough, in a manner in which will be described in detail in connection with FIGS. 6 and 7.

OPTICAL READOUT

Figure 6:
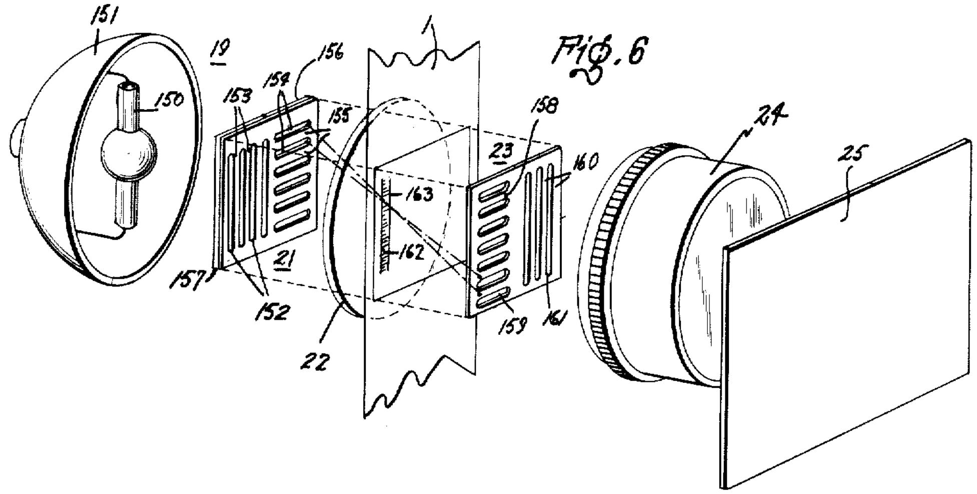
FIGURE 6 is an isometric projection of the optical readout circuit of the system of FIGURE 1.
Figure 7:
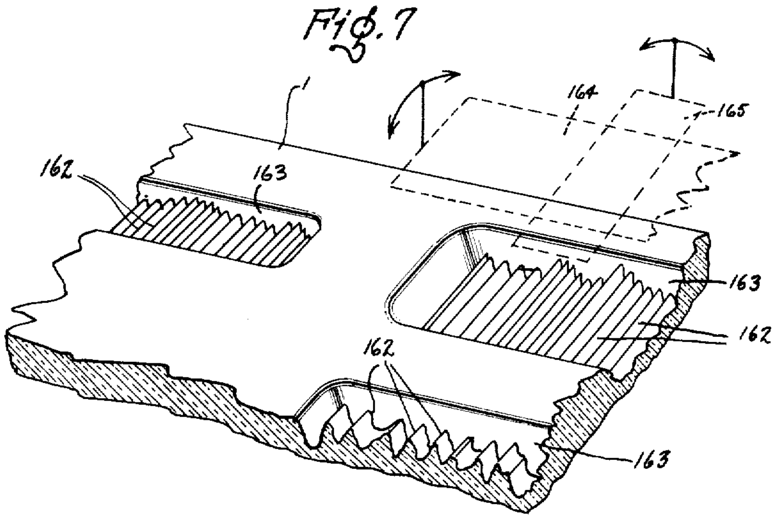
FIGURE 7 is a greatly enlarged isometric projection of a typical orthogonal grating structure on the thermoplastic.
Figure 1A:
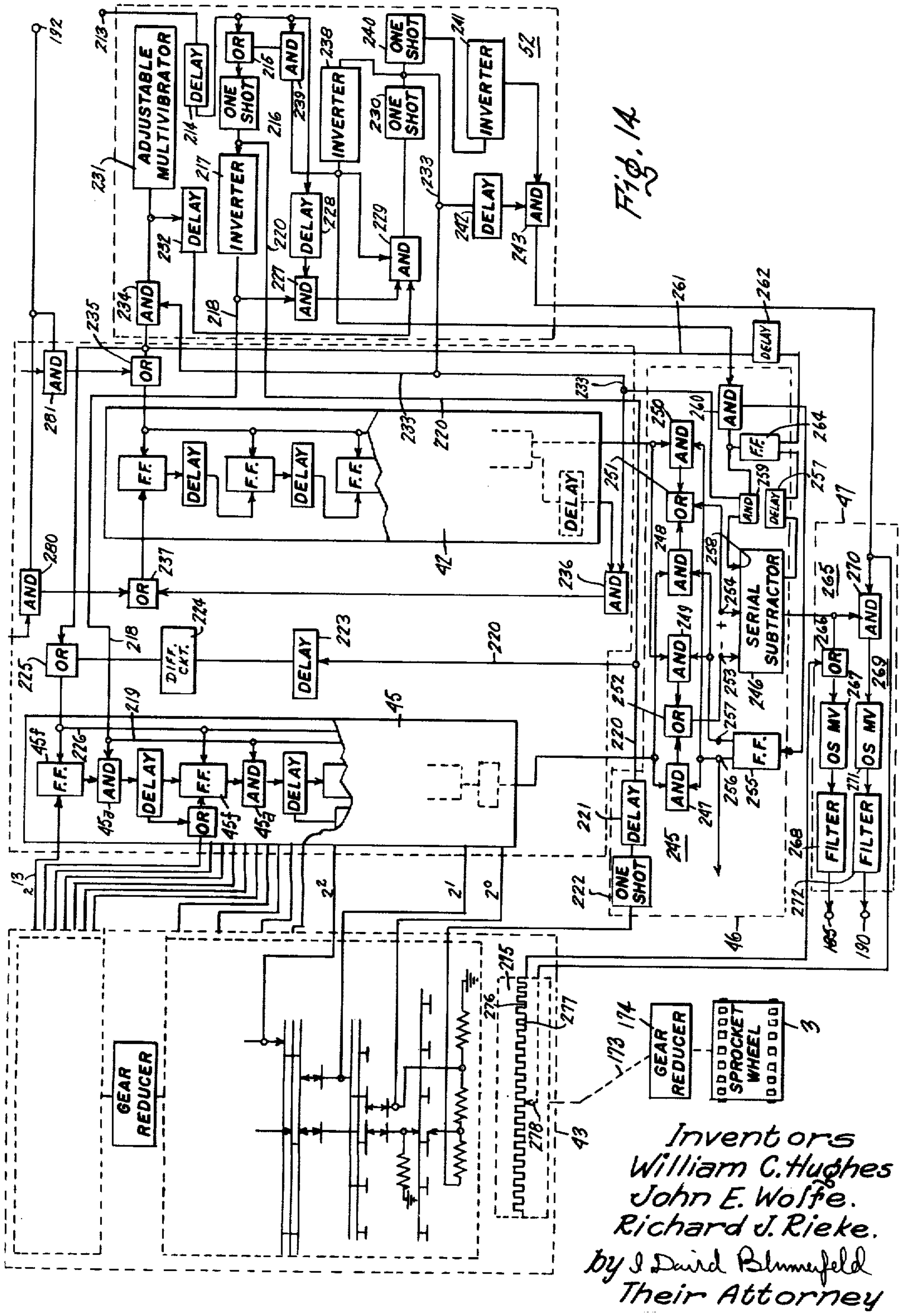

The optical readout of system for retrieving the information stored on the thermoplastic tape 1 is shown in detail in FIGURE 6. The optical readout comprises broadly a light source to produce a beam of white light, a mask and filter arrangement to project magenta light (i.e. white light minus green) through the red and blue gratings, and a mask and filter arrangement for projecting green light through the horizontally extending groove. A corresponding mask arrangement is positioned to intercept the light as modified by the deformations on the thermoplastic and transmits selected quantites thereof to form a color image in space which may be projected onto viewing screen or the like. The optical readout of FIGURE 6 includes a source of high intensity white light 19 comprising an arc source 150 positioned at the focal point of a parabolic reflector 151 which projects white light onto a filter and mask arrangement 21. The filter and mask arrangement 21 comprises an orthogonal mask containing a plurality of vertical light transmitting apertures 152 separated by opaque portions 153, and a plurality of horizontal light transmitting apertures 154 separated by opaque portions 155. A magenta filter element 156 is positioned directly behind the horizontal apertures 154 and filters the green light so that the light passing through the apertures 154 includes all of the wavelengths in the visible spectrum except green. Correspondingly, a green filter 157 is positioned behind the vertical apertures 152 which filter removes all the wavelengths except the green so that only green light is transmitted.

The light emerging from the mask filter combination 21 passes through an objective lens 22 which projects it through the thermoplastic tape 1 and focusses it onto a second mask assembly 23. Specifically, the horizontal flat beams of magenta light coming through the apertures 154 on the mask 19 are so projected by the lens 22 that in the absence of any red and blue gratings 162 on the thermoplastic 1, the magenta beams are intercepted by the opaque portions 158 separating the horizontal apertures 159 of the mask 23. Similarly, the vertical green light beams from the apertures 152 are projected, in the absence of the green groove 163 extending in the direction of movement of the thermoplastic tape 1, onto the opaque portions 160 separating the vertical apertures 161 in the mask 23. Thus in the absence of any deformations on the thrmoplastic tape 1 the blue, red and green colors do not pass through apertures 159 and 161 and, hence, no light is transmitted through the projection lens 24 onto the viewing screen 25.

If deformations are present on the surface of the thermoplastic, however, the magenta light is diffracted vertically in space by the gratings 162 to produce its spectral color components. Of these the red and blue components are so positioned as to be transmitted through the apertures 159. The vertical green light beams from apertures 152 are refracted horizontally by groove 163 by an amount sufficient to transmit a portion of the green light through the vertical apertures 161 and the mask 23. The manner in which the deformations produce these effects may be understood more readily by reference to FIGURE 7 which illustrates in greatly enlarged form the deformation structure on the surface of the thermoplastic. Thus, a groove 163 of a given width W and of a depth H extends in the direction of tape movement and represents the green color information. If a vertical beam of green light, as illustrated in cross-section by the dashed rectangle 164, is projected through the groove 163, the width and depth of the groove controls the amount which this green light is bent horizontally, in the direction of the arrows, and hence the amount of this green light which passes through the vertical apertures 161 in mask 23. That is, the narrower and deeper the groove 163 the more the green light will be bent in the direction of the arrows and more of the light falls on the apertures 161 to be transmitted onto the screen 25.

Simultaneously, the flat beam of magenta light from apertures 154 of the mask 19, illustrated in cross-section by the dot-dash rectangle 165, is diffracted by the gratings 162 into its spectral components. The red and blue spectral components are displaced vertically in the direction of the arrows and fall on the horizontal apertures 159 of the mask 23. The amount of displacement in space and hence the amount of the red and blue light transmitted through these apertures is controlled by the spacing and the depth of the red and blue grating 162 at the bottom of the green groove 163. In this manner color information in the form of three primary color components blue, red and green are projected from the thermoplastic storage medium 1 to the mask 23 and onto the screen or similar receiving medium 25 to produce a color image representative of the data stored on the thermoplastic. This novel scheme for storing color information on a thermoplastic medium in the form of an orthogonal grating representing three primary colors red, blue and green is described in detail and claimed in U.S. Patent No. 3,118,969 issued January 21, 1964, entitled "Color Projection System," William E. Glenn, Jr., inventor and assigned to the General Electric Company, the assignee of the present invention.

For the purposes of the instant application it is sufficient to say that the orthogonal deformation structure for storing color information in the form of three primary colors is highly advantageous in that enhanced accuracy and color fidelity is possible because interaction between the various color components during the retrieval stage is eliminated.

*Tape drive motor control circuits*

The drive motor control circuits which were described briefly in connection with the circuit of FIGURE 1, function to transport the tape in the proper direction to position it at the desired location or "address." FIGURE 8 illustrates the motor circuit to drive the tape drive wheel 3 in the proper direction and at the proper speed to achieve this result. The tape drive motor 49 is energized, in a manner presently to be described, from a suitable source, not shown, connected to the input terminals 177 through leads 178 and a plurality of contact members $C_{2SR}$, $C_{2SW}$, $C_{2STOP}$, and $C_{2REV}$. The motor 49 drives the tape sprocket drive wheel 3 through gear reducer 171, gears 172, and a drive shaft 173. The shaft position encoder 43 is also mounted on the drive shaft 173 and is coupled thereto by means of a further gear reducer 174. The encoder 43 includes a plurality of coded discs mounted in a housing 175. Each of the discs in the housing includes a plurality of coded tracks, such as those shown partially in FIGURE 9, which produce 14 digit shaft position information. A solenoid motor brake 176, illustrated in block diagram form, is connected through a normally closed contact $C_{2S}$ and normally opened contacts $C_{2SW}$ and $C_{2SR}$ to the terminals 177. The solenoid brake 176 is so constructed that energization of its solenoid disengages the brake and permits the motor to run. Whenever the tape is positioned, the normally closed contact $C_{2S}$ opens deenergizing the brake coil so that the brake engages and prevents any further movement of the motor 49.

The manner and sequence in which the various contact elements in the supply circuit for the motor 49 are actuated to supply energizing voltage thereto may best be understood in connection with the circuits of FIGURES 10 and 11 which contain the various relays for actuating these contacts. During the interval when address information is being supplied from the external circuit to the shift register 42, the motor 49 is deenergized since the two contact elements $C_{2SW}$ and $C_{2SR}$ are open since their associated relays are deenergized. After the address information has been stored in the shift register, the external circuit supplies either a SEEK-READ or a SEEK-WRITE command pulse to the input terminals 179 and 180 of the pulse relay circuits of FIGURE 10.

The appearance of such a SEEK-READ or SEEK-WRITE command pulse at these input terminals overcomes the biasing voltages applied through voltage dividers 181 and 182 to the control electrodes of a pair of gaseous discharge devices 183 and 184. The gaseous discharge devices thereby become conducting and energize the READ and WRITE relay coils $R_{2SW}$ and $R_{2SR}$ connected in their anode circuits. Thus, by the way of example, if a SEEK-READ pulse arrives at the input terminal 179 the gas discharge device 183 becomes conducting energizing its associated relay coil $R_{2SR}$ closing the contact $C_{2SR}$ in the lead 178 of the motor control circuit. Energization of relay $R_{2SR}$ also closes the contact $C_{2SR}$ in the anode circuit of the gas tube 183 connecting the anode to ground through normally closed contact $C_{2RWF}$ and the discharge device becomes nonconducting. The relay coil $R_{2SR}$ remains energized however since the closure of the contact $C_{2SR}$ and the normally closed contact $C_{2RWF}$ now completes an energizing circuit for the relay coil from ground to a source of positive potential indicated at B+.

With the contact $C_{2SR}$ in the motor energizing circuit closed, energizing voltage is applied to the motor 49 if the normally closed contact $C_{2STOP}$ is in its deenergized condition. The relay coil controlling the normally closed contact $C_{2S}$ is contained in the motor relay circuit 48, shown in FIGURE 11, and is in turn controlled from the output of the comparator 46 and motor control signal generating circuits 47 of the address register where the shaft position information and the address information is continuously compared. That is, the relay $R_{STOP}$ controlling the contact is connected to the output circuit of an amplifier 185 which receives a control signal from the motor control signal generating circuit 47 at an input terminal 186. If the input at the terminal 186 is zero, indicating that the tape is at the position called for by the "address" information from the external circuit, the $R_{STOP}$ relay in the output circuit of the amplifier 185 is energized and the normally closed contact $C_{2S}$ is open and the motor 49 is deenergized. If, on the other hand, a signal is applied to the terminal 186 from the motor control signal generating circuit 47, indicating that the tape is not at the desired "address," the $R_{STOP}$ relay is deenergized, the contact $C_{2STOP}$ is closed, energizing the motor 49 and driving the tape sprocket wheel 3 in the proper direction to position the tape at the desired address. Simultaneously, the contact $C_{2STOP}$ in the solenoid brake energizing circuit is also closed, energizing the brake coil and disengaging the brake member.

Energization of the relay coil $R_{2SR}$ also closes a contact $C_{2SR}$ in the control circuit 55, shown in FIGURE 12, supplying a negative potential from a negative supply bus (−) to an output terminal 213 which is connected to a corresponding input terminal in the timing circuit 52 of the address register. The negative potential at the terminal 213 functions as a SEEK signal which initiates operation of the timing circuit to supply the required timing signals to the various components in the address circuit shown in detail in FIGURE 14. An additional contact $C_{2SR}$ in control circuit 55 is also closed when the SEEK-READ solenoid $R_{2SR}$ is energized and grounds one end of a resistance 187, the other end of which is connected to the negative bus (−) so that a reference or ground potential appears at the output terminal 192. This ground potential at the terminal 192 is supplied to the address circuit and acts as an ADDRESS LOCKOUT signal and prevents further address information from the external circuit from being entered into the address register 42.

With the motor 49 thus energized, the tape drive wheel 3 is driven in a predetermined direction and for a predetermined period of time determined by the output from the motor control signal generating circuit which supplies potential to the input terminal 186 of the motor control circuit relay $R_{STOP}$.

The motor control relay circuit 48 contains two additional relay circuits which perform the function of reversing the rotation of the motor 49 in response to a control signal from the address circuit, and controlling the speed of rotation of the motor in response to a further signal from the said address circuit. In addition, a fourth relay circuit is provided which is energized in response to energization of the $R_{STOP}$ relay to actuate a signal generating means in the control signal circuit 55 to provide an ADDRESS LOCATED signal to the external circuit whenever the motor stops to thereby initiate the reading or writing cycle. The motor reversing relay circuit referred to above comprises an input terminal 188 which receives control signals from the address circuit. These signals are amplified in an amplifier 189 to control the energization of a reversing relay $R_{REV}$. The control signal appearing at the input terminal of 188 is supplied from the output of the comparator 46 of the address circuit either as a negative potential or a relatively positive or ground potential. On the appearance of the negative reversing potential at the input of the amplifier 189, the relay $R_{REV}$ is deenergized and the normally open contacts $C_{2R}$ in the motor supply lead 178 open while the normally closed contacts are deenergized and the energizing voltage from the terminal 177 is applied to the motor with a given polarity. If, on the other hand, the potential at the input terminal 188 is at ground, the reverse relay $R_{REV}$ remains energized and the normally closed contacts $C_{2R}$ are open and the normally opened contacts are closed, reversing the polarity of the applied energizing voltage and reversing the direction of rotation of the motor.

The relay circuit for controlling the speed of the motor 49 includes an input terminal 190 which receives a control signal from the address circuit indicating that a large difference exists between the desired "address" position and the actual shaft position. This signal is amplified in an amplifier 191 to deenergize a motor speed relay $R_{SLOW}$ closing contact $C_{2SLOW}$ in the energizing motor lead 178 to bypass a speed control resistor 192 in the motor energizing circuit. That is, the contact $C_{2SLOW}$ is closed whenever its associated $R_{SLOW}$ relay is deenergized. In the absence of an input signal to the terminal 190 the relay $R_{SLOW}$ is energized and contact $C_{2SLOW}$ is open so that the energizing voltage for the motor 49 includes the drop across the speed control resistance 192. Upon the appearance of an input signal at the terminal 190, the relay $R_{SLOW}$ is deenergized. The contact $C_{2SLOW}$ closes, shorting out the speed control resistance 192 and increasing the voltage to the motor 49. As a result the running speed of motor 49 is increased and sprocket drive wheel 3 is driven at a greater speed until the tape approaches the desired address position at which time the input signal at the terminal 190 disappears, energizing the relay $R_{SLOW}$ and opening contact $C_{2SLOW}$ so that the speed controlling resistance 192 is once again inserted in the motor energizing circuit reducing the running speed. In this fashion, the speed of the drive motor 49, drive wheel 3 and the tape is controlled selectively from the address circuit to provide either fast or slow operation of the tape transport mechanism.

In discussing the function of the shaft position encoder 43 in supplying shaft position information to the addressing circuit no consideration has been given, so far, to the fact that the tape transport mechanism which drives any selected "address" on the tape to either the reading or writing station, must take into account the fact that the reading and writing stations are separated by a fixed, finite physical distance. Therefore, any given location or "address" on the thermoplastic tape must be transported to a different position depending on the function to be carried out; i.e., read or write. One method of solving this problem is, of course, by providing two different "addresses" for the same area of tape, depending on whether the tape is to be positioned at the read or write station. However, while this may be satisfactory for many purposes, it does complicate the system since any elementary area of the tape containing a given bit of information must be provided with two different addresses depending on the nature of the action to be taken on it, i.e., writing of information on the elementary area or retrieval of information stored on this area in the readout system.

In the preferred embodiment, this complexity may be avoided, and the same address information supplied for a given incremental area on the tape both for the reading and writing position by modifying the encoder position in response to a READ signal so that digital information representative of the distance between the read and write stations are selectively added and subtracted to the shaft position information. This accommodation is achieved by introducing a fixed angular displacement of the encoder housing whenever a SEEK-READ pulse appears at the input terminal 179 so that the housing and the code disk brushes are rotated through a predetermined angular distance, introducing an additional binary quantity from the encoder which is proportional to the distance between these stations. To this end, the solenoid 193 is connected through a normally open contact $C_{2SR}$ to a source of positive potential connected to the terminal 194. The solenoid 193 actuates a plunger 195 which is rigidly connected to a spring biased pivot arm 196, seen most clearly in FIGURE 9, which is fixed to a shaft 200 which rotates the shaft encoder housing 175. Whenever a SEEK-READ pulse appears at the input terminal 179 energizing the relay $R_{2SR}$, contact $C_{2SR}$ is closed energizing the solenoid 193. When the solenoid 193 is energized, plunger 195 is pulled in towards the left rotating arm 196 in a counter clockwise direction against the action of the spring and rotating the shaft position encoder housing and the encoder brushes a predetermined fixed angular distance. This fixed angular displacement introduces a binary quantity to the encoder output which introduces the fixed displacement of the tape to position it at the writing station.

After the tape transport mechanism drives the tape to the proper position in response to the information in the address circuit, the output of the comparator 46 and the motor control signal generating circuit 47 go to zero, so that the input signal at input terminal 190 goes to zero, the stop relay $R_{STOP}$ is energized, the normally closed contact $C_{2STOP}$ in the lead 178 opens removing the supply voltage from the motor 49. Simultaneously, the normally closed contact $C_{2STOP}$ in the brake energization circuit opens, deenergizing the brake solenoid so that brake 190 engages the motor shaft and locks the motor 49 in position. A third contact $C_{2STOP}$ in the motor relay circuit 48 closes energizing an ADDRESS-LOCATED relay $R_{ADD.LOC}$. A contact $C_{2AL}$ in control signal circuit 55 of FIGURE 12 closes and applies a negative potential from the negative supply bus (−) to a differentiating circuit 201 producing a short negative pulse at the output terminal 202. The negative ADDRESS-LOCATED pulse at terminal 202 is supplied to the external circuit indicating that the tape has been properly positioned and that the system is ready for the reading or writing sequence.

Simultaneously, energization of relay $R_{ADD.LOC}$ closes a second contact $C_{2AL}$ in the motor control circuit of FIGURE 8 applying positive potential to a LOCATOR solenoid 203 which actuates a ratchet plunger 204 to engage and lock ratchet gear 205. In this manner the motor and the tape drive sprocket wheel are positively secured against further rotation by means of the brake 176 and ratchet gear arrangement 204 and 205.

After the information has either been retrieved or the information has been written on the thermoplastic tape, depending on the nature of the command signal from the external circuit, a READ-WRITE finished command signal is provided from the external circuit to reset all of the circuits and condition them to receive new address information. The READ-WRITE FINISHED command signal is supplied to an input terminal 206 and to a normally non-conducting gaseous discharge device 208 which has a negative bias applied to its control electrode by means of a voltage divider 207. The appearance of the READ-WRITE FINISHED command signal at the terminal 206 overcomes the bias on control grid and the tube 208 conducts, energizing the READ-WRITE FINISHED relay $R_{2RWF}$ connected in the anode circuit of the tube 208. Upon energization of the relay, the relay $R_{2RWF}$ is locked in by the closure of a contact $C_{2RWF}$ in its anode circuit completing an energizing circuit for the relay through the contact $C_{2SR}$ or the contact $C_{2SW}$. The energization of this relay deenergizes either the SEEK-READ relay $R_{2SR}$ or the SEEK-WRITE relay $R_{2SW}$ by opening the normally closed contact $C_{2RWF}$ in their lock-in circuits. Deenergization of the SEEK-READ or the SEEK-WRITE relays opens, after a slight delay, the contact $C_{2SR}$ or $C_{2SW}$ in the READ-WRITE FINISHED relay circuit immobilizing the READ-WRITE FINISHED relay $R_{RWF}$. Simultaneously, the contacts $C_{2SR}$ and $C_{2SW}$ in the control signal circuit 55 open removing the SEEK signal from the terminal 213 and disabling the timing circuit 52. In addition the contacts $C_{2SR}$ and $C_{2SW}$ in the ADDRESS-LOCKOUT circuit open so that a negative potential appears at the output terminal 192. This negative potential is supplied to the address circuit and conditions it to receive further address information from the external circuit.

The contacts $C_{2SW}$ and $C_{2SR}$ in the motor leads 178 also open as does the $C_{2SR}$ contact in the READ-WRITE switch solenoid returning the shaft encoder housing 175 to a neutral position. In this manner the entire motor control circuit as well as the control signal generating circuits are disabled and are in condition to repeat the entire operating cycle.

Energization of READ-WRITE FINISHED relay $R_{RWF}$ actuates an RF heating circuit, illustrated at 60 in FIGURE 13, to supply radio frequency energy to the thermoplastic tape. When contact $C_{2RWF}$ closes, and the SEEK-WRITE relay $R_{2SW}$ was previously energized, a negative potential is supplied to a differentiating circuit 209 through contacts $C_{2RWF}$ and $C_{2SW}$. A negative potential appears at the output of the differentiating circuit 209 triggering one shot multivibrator 210 pulsing radio frequency oscillator 211 to produce a short burst of RF energy at its output terminals 212. The terminals 212 are coupled to the RF electrodes 14 of FIGURE 1 so that the RF energy induces a heating current in the conducting layer of the thermoplastic tape bringing the thermoplastic film to a fluid state. The electrostatic forces due to the electron charge pattern on the surface of the tape then deform the fluid of the thermoplastic producing the desired deformation pattern. Furthermore, the RF oscillator is also pulsed whenever the ADDRESS-LOCATED signal is generated. That is, in the event an incremental area of tape is brought into the writing position to store information thereon, it is necessary to erase whatever material may previously have been stored at this incremental location. Hence, heating energy must be supplied to soften the thermoplastic film and erase any previously stored deformations. To this end, a $C_{2AL}$ contact is closed in a heating channel whenever the address located relay $R_{ADD.LOC}$ is energized closing the contact $C_{2SW}$. A negative potential is applied through a differentiating circuit 209*a* to trigger a one shot multivibrator 210*a* and pulse the RF oscillator 211. The burst of RF energy which is applied during the erase cycle is longer than that during the develop cycle since the output pulse from one shot 210*a* pulses RF oscillator 211 for a longer period than one shot 210. After the information has been erased, the incremental area of thermoplastic tape in the writing position is ready to receive further information in the form of electrons deposited thereon by the electron writing beam.

ADDRESS CIRCUIT

In the foregoing description a general discussion of the addess circuit was given. A detailed showing, in block diagram form, is now provided in connection with FIGURE 14 of the portion of the address circuit which controls the tape transport mechanism to provide random access to any location or "address" on the tape. Broadly speaking, FIGURE 14 comprises the following major components: The address shift register 42, the shaft position and encoder 43, the shaft position register 45, the comparator circuit 46, the motor control signal generating circuit 47, and a timing circuit 52.

During each positioning cycle of a randomly chosen tape location or "address," the timing circuit 52 provides a plurality of timing signals which enable the registers, comparators, motor control circuits, etc., to perform various functions in the proper sequence. The various timing signals provided by this circuit are as follows:

(1) A RESET signal for the shaft position register 45 clearing it of any previous stored information by returning the individual flip flops thereof to the binary "zero" condition.

(2) An ENERGIZING signal for encoder 43 whereby new digital position information may be transmitted to and stored in the register 45.

(3) An ISOLATING signal for the register 45 to isolate the individual flip flops during the period the encoder is energized to prevent inadvertent shift through of the digital information.

(4) A READOUT enabling signal to transmit shift pulses from a clock pulse generator to the registers to readout the stored "addess" and shaft position information to the comparator 46.

(5) A RECIRCULATE signal which conditions a gate circuit to recirculate the 14 digit "address" information stored in the register 42 during the readout of the information.

(6) An ENABLING signal for controlling the speed of the motor by energizing a "run fast" motor signal generating circuit.

(7) A FINAL POSITIONING signal to enable a vernier shaft position encoder 271 for final positioning of the tape.

As was discussed briefly in connection with the overall description of the system illustrated in FIGURE 1, after the 14 digit "address" information has been stored in the shift register 42, a SEEK signal is supplied to the input terminal 213 of the timing circuit in the form of a negative going pulse. The SEEK signal is transmitted through a delay circuit 214 to an "OR" gate 215 to trigger one shot multivibrator 216 which produces at its output a negative pulse. The negative pulse from the one shot multivibrator 216 is supplied to the input of an inverter circuit 217 which inverts the polarity and produces a positive going pulse. The positive pulse is supplied as an ISOLATING signal over the lead 218 to the shift register 45 where it is supplied over a bus 219 to the several "AND" gates 45*a* of the register. This positive ISOLATING signal disables the "AND" gates 45*a* and prevents them from transmitting any pulses between the several flip-flop stages 45*f*. By thus isolating the individual flip-flop stages of the register, inadvertent transfer of digital information between the flop flops 45*a* is prevented during the time the encoder 43 supplies digital shaft position information.

Simultaneously, the negative output pulse from the one shot multivibrator 216 is supplied over a lead 220 to the input of a delay circuit 22 and thence, after a predetermined delay, to a one shot multivibrator 222 which produces an energizing output pulse of short duration which is applied to the encoder 43 to provide at its output terminals $2^0$, $2^1$, $2^2$, $2^3$, etc., a 14 digit shaft position pulse signal to the register 45. The delay of the negative pulse from the one shot multivibrator 222 is arranged to be greater than that produced by the delay circuit 223 and the differentiating circuit 224 to which this negative pulse is also supplied. The delayed and differentiated negative pulse from differentiator 224 is supplied through an "OR" gate 225 to a reset bus 226 in the register 45 to reset all of the flip-flops to a binary "0" condition. The register 45 is thus cleared and the various stages isolated prior to the energization of the encoder 43 so that it is conditioned to receive shaft position information.

When the one shot multivibrator 216 in the timing circuit 52 reverts to its normally stable condition after being triggered by the SEEK signal, terminating the negative output pulse, the potential at the output of the inverter 217 goes negative applying a negative potential to an "AND" gate 227 which also receives the delayed SEEK signal from a delay circuit 228. The delay circuit 228 prevents the "AND" gate 227 from transmitting upon the first appearance of the SEEK signal. That is, when the SEEK signal first appears at the input terminal 213, the one shot 216 is still non-conducting so that the output of the inverter 217 is negative. If the SEEK signal were applied directly to "AND" gate 227 the possibility exists that the gate would transmit a pulse at this time. Hence, the SEEK signal is applied to the "AND" gate 227 in such a manner that "AND" gate 227 conducts only after the termination of the first positive pulse from the inverter 217. When this positive pulse terminates, and the negative potential is applied to the "AND" gate 227 a negative potential appears; the output of "AND" gate 227 and is applied to one of the inputs of "AND" gate 229. A negative clock pulse appearing at the other input of "AND" gate 229 is thus allowed to pass through "AND" gate 229 to trigger one shot multivibrator 230. Clock pulses from a clock pulse generator 231 are applied to the "AND" gate 229 through a delay circuit 232 which delays the pulse by a duration equal to one-half of the period between pulses so that the first clock pulse supplied to the gate after the appearance of the negative potential from gate 227 is transmitted by the "AND" gate 229 to trigger a one shot multivibrator 230. The one shot 230 produces a negative pulse which is supplied over the conductor 233 as a READOUT-ENABLING signal to an "AND" gate 234 coupled to the output of the clock pulse generator 231. The negative pulse opens "AND" gate 234 so that clock pulses are now transmitted through this gate and "OR" gates 234 and 225 to the shift registers 42 and 45 to shift the stored digital information in these registers out to the comparator circuit 46.

The READOUT-ENABLING pulse for the "AND" gate 234 has a duration equivalent to 14 clock pulses so that the entire 14 digit pulse information is shifted out of the two registers to the comparator circuit 46. In order to insure that only 14 pulses pass through, the READOUT-ENABLING signal is first applied to the "AND" gate 234 between clock pulses. That is, the READOUT-ENABLING signal is fire applied to the is always initiated midway between two clock pulses in order to eliminate the possibility that the "AND" gate 234 will be enabled at the precise time that a clock pulse is supplied to its input, in which event the possibility exists that 15 shift pulses might be transmitted to the registers which, as will be appreciated by those skilled in the art, would introduce serious errors into the operation of the circuit. Hence, the clock pulse which triggers one shot 230 is always delayed by the circuit 232 to arrive at "AND" gate 229 midway between clock pulses supplied to gate 234.

At the same time that the negative output pulse from the one shot 230 is supplied to the clock pulse "AND" gate 234, the pulse is also supplied to an "AND" gate 236 connected to the output from the shift register 42. This negative pulse opens "AND" gate 236 to recirculate the 14 digit address information back into the register 42 through an "OR" gate 237. It will be appreciated that the 14 digit address information is thus restored in the register 42 at the end of the 14 clock pulse readout so that it may subsequently be compared with the new shaft position information stored in the shift register 45. In this manner, the address information in the register 42 is continuously replenished and compared with the shaft position information in the shift register 45 until the information stored in both of these registers is identical and the output from the circuit goes to zero indicating that the tape has been properly positioned.

The negative output pulse from the one shot 230 is also supplied to the input of an inverter circuit 238 which inverts its polarity and produces a positive pulse of the same duration as the pulse produced by one shot 230. This positive output pulse is, in one instance, fed back to close the "AND" gate 229 and prevent clock pulses, other than the first one, from being transmitted through this gate to the one shot 230. The positive going output pulse from the inverter 238 is also supplied to an "AND" gate 239 which also receives the SEEK signal from the delay circuit 214. The output from the "AND" gate 239 is supplied to the input of the "OR" gate 215 which controls the firing of the one shot multivibrator 216. It can be seen, that at the end of the negative output pulse from the one shot multivibrator 230, signalling the end of one 14 pulse register readout period, the output potential at the inverter 238 becomes negative, applying a negative pulse front to the "AND" gate 239 which is transmitted through the "OR" gate 215 to trigger the one shot 216 to repeat the entire timing cycle. Thus the inverter circuit 236 cooperates with the "AND" gate 239 and the "OR" gate 215 to provide lock-in circuit operation so that the address information is repeatedly compared with the shaft position information until the tape is positioned at the desired location on "address" and the SEEK signal disappears. The remaining elements of the timing circuit 52, comprising the one shot multivibrator 240, inverter 241, delay circuit 242, and the "AND" gate 243, function to provide an ENABLING signal for a "run fast" circuit in the motor control signal generating circuit 47, which will be described in detail later in connection with the description of this "run fast" circuit.

As has been pointed out above, the timing circuit 52 periodically produces a negative pulse from the one shot 230 which opens "AND" gate 234 to transmit clock pulses to the shift registers from the clock pulse generator 231. The READOUT-ENABLING signal from one shot 230 is of a duration to allow for 14 clock pulses to pass through the gate to the shift registers. Therefore, each clock pulse shifts one digit of the 14 digits signal stored in the two registers out of the last stage to comparator circuit 46. The output digits from the two registers are transmitted through a reversing switch circuit 245 to a serial subtractor 246. The polarity reversing switching circuit 245 and the serial subtractor circuit 246 constitute, generally, the comparator circuit 46 in which the 14 digit address information in the register 42 and the 14 digit shaft position information in the register 45 are compared and subtracted in a digit fashion to produce at the output thereof a digital pulse signal representing the difference.

It will be appreciated, that in order to carry out the digital subtraction in the circuit 246 provided for this purpose, the digital information in the two shift registers 42 and 45 must be selectively supplied to this circuit either as the subtrahend quantity or the minuend quantity. Which of these digital quantities will be supplied as the subtrahend or the minuend will depend in part on the present position of the shaft, the new "address" or location to which the tape is to be driven, and the direction which the tape must be driven in order to arrive at the new location. That is, to provide truly random access for reading and writing purposes, the system must be capable of driving the tape both in the forward and reverse direction. It follows, therefore, that in some cases the digital quantity in the shift register 42 will be larger than that in register 45 whereas in other cases the reverse will be true. Hence, a means must be provided which selectively supplies the information stored in the two registers to the subtractor 246 so that the output from the subtractor is always positive. This will be more readily understood, by the way the example, if it is assumed for the moment, that the shaft position information from the register 45 is supplied to the subtractor 246 as the minuend and the address information in the shaft register 42 is supplied as the subtrahend. It may be, however, that under a given set of conditions, i.e., previous tape position and address information, that the "address" information in the shift register 42, may be larger than the shaft position information in which case the output of the subtractor 246 is negative. Under these circumstances, it is necessary to reverse the manner in which the information is supplied to the subtractor so that the address information in the register 42 is now supplied as the minuend and the shaft position information in the register 45 is supplied as the subtrahend making the output from the subtractor is positive. In addition, whenever it is necessary to switch the outputs from the registers in this manner, a directional signal should also be provided to control the direction of rotation of the driving motor in synchronism with the operation of the switching mechanism.

To this end, the reversing switch circuit 245 includes a pair of "AND" gates 247 and 248, connected to the output of shaft position register 45, and a second pair of "AND" gates 249 and 250 connected to the output of the address information shift register 42. "AND" gates 248 and 250 transmit binary information through an "OR" gate 251 to the minuend (+) terminal 254 of the subtractor 246. "AND" gates 247 and 249, on the other hand, transmit binary information through an "OR" gate 252 to the subtrahend (−) terminal 253. The "AND" gates 247, 248, 249, and 250 are always energized in pairs so that either gates 247 and 250 are open and gates 248 and 249 are closed, or gates 248 and 249 are open and "AND" gates 247 and 250 are closed. It will be apparent that if the gates 248 and 249 are closed, information from the shaft position register 45 is transmitted through "AND" gate 247, "OR" gate 252 to the subtrahend terminal 253, whereas the information from the address register 42 is transmitted through the "AND" gate 250, "OR" gate 251 to the minuend terminal 254. If, on the other hand, the "AND" gates 247 and 250 are closed, the shaft position information from the shift register 45 is transmitted through "AND" gate 248, "OR" gate 251 to the minuend terminal 254 and the address information from the shift register 42 is transmitted through "AND" gate 249, "OR" gate 252 to the subtrahend (−) terminal 253. It can be seen, therefore, that the address and shaft position information may be supplied to the serial subtractor either as the minuend or subtrahend, by controlling the respective "AND" gate pairs of the switch 245.

"AND" gate pairs 247–250 and 248–249 are controlled by an enabling flip flop 255 which produces at its output terminals 256 and 257 potentials of opposite polarity. The output potential at terminal 256 is supplied to "AND" gates 247 and 250 and the potential at terminal 257 to "AND" gates 248 and 249. In one of its stable states, the flip flop 255 provides a negative potential at terminal 256 opening "AND" gates 247 and 250, and a positive or ground potential at the terminal 257 closing "AND" gates 248 and 249. In its other stable state, the polarity of the potentials at the terminals is reversed and negative potential is supplied to the "AND" gates 248 and 249 and the relatively positive or ground potential to the "AND" gates 247 and 250. The flip flop 255, being a bistable device, remains in one or the other of its stable states until a triggering signal is appplied to its input, causing it to change states, and remains in that state until the application of the next triggering impulse.

The triggering impulse for changing the stable state of the flip flop 255 is provided from the output of the serial subtractor 246, in a manner now to be described. The serial subtractor 246, as is customary in binary subtraction, subtracts in a digit by digit manner with each digit of the minuend being decreased by the corresponding digit in the subtrahend. If, in the course of this digit by digit subtraction, the minuend digit becomes less than the subtrahend, which would be the case whenever a binary "1" is subtracted from a binary "0," the minuend digit of the next higher order must be reduced by one; that is, a binary "1" must be borrowed from the next higher order. As a result a "borrow" signal is fed back through a slight delay 257 from the output of the subtractor 246 to a "borrow" input terminal 258 through "AND" gate 259, the operation of which will be described later. The binary "1" borrow signal is provided by a borrow flip flop 264 which is set by the output of the subtractor 246 whenever the minuend of the next higher order must be reduced by one and is reset to supply a negative pulse or "1" to the subtractor at the time of the next clock pulse supplied from the clock pulse "AND" gate 234 over the conductor 261 and through delay 262. For a more detailed description of the theory and construction of digital subtracting devices, reference is hereby made to Chapter 4 of Arithmetic Operations in Digital Computers, R. K. Richards (1955), D. Van Nostrand Company, Inc., New York, and particularly pages 113–135 of this chapter.

In operation flip flop 264 serves to store the "borrow" value from the subtraction of a previous digit until it is required in the subtraction of the next succeeding digit.

Therefore, it is not necessary that flip flop 264 be reset on the first of the 14 pulses which clock the data out of registers 42 and 45 since the first "borrow" will obviously always be zero. To prevent resetting flip flop 264 on this first pulse, a one clock pulse period delay 262 is included in line 261. It will be recognized that on the subtraction of the second digit the first clock pulse will emerge from delay 262 to reset flip flop 264 to produce an output on line 258 if there happens to be a carry on the first subtraction. Since any borrow occurring on the second digit will appear immediately in the "borrow" output of serial subtractor 246, a slight delay 257 is included to prevent flip flop 259 from receiving set and reset pulses simultaneously.

The binary "1" "borrow" signal produced by the flip flop 259 is supplied both to the input terminal 258 of the subtractor through "AND" gate 259, and to the "AND" gate 260 which also receives the output signal from the inverter 238 of the timing circuit 52. The output signal from the inverter 238 is, however, at a relatively positive potential or ground potential during the time that clock pulses are supplied to the registers, and hence any binary "1" signals produced by the flip flop 264 are not transmitted through the "AND" gate 260 to trigger the flip flop 255.

At the end of 14 clock pulses from the clock pulse generator 231, however, the output from the inverter 238 becomes negative, so that the "AND" gate 260 is conditioned to transmit binary "1" signals from the flip flop 264. The last of the 14 clock pulses does not emerge from delay circuit 262 until half a clock pulse period later, however. If at this time the flip flop 264 is in the set condition it will be reset by the last clock pulse emerging from delay circuit 262 and the resulting binary "1" "borrow" signal is generated at the output of the flip flop 259, indicating that the subtrahend is larger than the minuend and that a negative result has been obtained. This binary "1" signal is transmitted through the "AND" gate 260 to the flip flop 255, reversing its state and reversing the conducting condition of the "AND" gate pairs 247–250, and 248–249. This binary "1" signal is, however, prevented from being supplied to the input of the subtractor 246 by the action of "AND" gate 259 which is disabled at the same time that "AND" gate 260 is enabled. In operation, for example, if initially the state of the flip flop 255 is such that the "AND" gate pair 247–250 is open, the shaft position data in the register 45 is supplied to the sugtrahend (−) terminal 253, and the address information in the register 42 to the minuend (+) terminal 254. If, at the end of the 14 clock pulses the output from the serial subtractor 246 indicates that the subtrahend is larger than the minuend, a pulse is transmitted through the "AND" gate 260, reversing the state of flip flop 255 and the polarity of the signals at its output terminals 256 and 257, closing the "AND" gates 247 and 250 and opening the "AND" gates 248 and 249. Thus, the shaft position information in the register 45 is now supplied to the minuend (+) terminal 254 of serial subtractor 246 and the address information to the subtrahend (−) terminal 253. The timing circuit 52 proceeds through another cycle and the subtracting operation is repeated, now producing a *positive output* representative of the difference between the pulse information stored in the registers.

In addition to providing the enabling voltage for the selected "AND" gate pairs, the flip flop 255 also produces an output signal supplied to the input terminal 188 of the motor control circuits which controls the direction of rotation of the motor by operating the reversing relay $R_{REV}$, which as was described with references to FIGURES 8 and 11, reverses the direction of rotation of tape drive motor 49.

The digital output from the serial subtractor 246 is supplied to the Motor Control Signal Generating Circuit 47 to produce the output signals which control the energization and speed of the tape drive motor 49. The pulse train from the serial subtractor is supplied to a first motor signal channel 265 through "OR" gate 266 which transmits each binary "1" signal in the pulse train to a one shot multivibrator 267, which produces an output pulse in response thereto. The output pulse from one shot multivibrator 267 is supplied through a filter 268 to the input terminal of motor control relay circuit 185, seen most clearly in FIGURE 11, to control the energization of a motor control relay $R_{STOP}$ and energize the tape drive motor 49. Thus, for each binary "1" signal appearing in the output pulse train from the serial subtractor the filter 265 stores a signal which controls the tape drive motor.

The output pulses from the serial subtractor 246 are also applied to an auxiliary "Run Fast" motor signal channel 269 which operates a relay $R_{SLOW}$ in the motor relay circuit 48 to short out a resistance in the control circuit of the tape drive motor and thereby control the motor speed. The "Run Fast" channel 269 is only energized, however, if the output from the serial subtractor indicates that the difference between the actual shaft position and the desired "address" position is large. Thus, the output pulse train from the serial subtractor 246 is supplied to an "AND" gate 270, a one shot multivibrator 271, and a filter 272. The one shot multivibrator 271 produces an output pulse whenever a binary "1" pulse from the serial subtractor output passes through the gate 270. The output pulse from one shot 271 is supplied through the filter 272 to the input terminal 190 of relay $R_{SLOW}$ of FIGURE 11 to operate a contact to short out a resistance in the tape drive motor control circuit. To make sure that the "Run Fast" channel 269 operates only when the difference between the shaft position and the address position is large, the "AND" circuit 270 is so controlled from the timing circuit 52 that it transmits pulses from the subtractor 246 only after the first three digits of the shaft position and address information have been subtracted. As pointed out previously in the description of the timing circuit 52, the "AND" gate 243 does not transmit a signal until after the first three clock pulses from the clock pulse generator 231 have been transmitted to shift the first three digits out of the registers. Thus, the "Run Fast" channel 269 is disabled, while the first three, and the least significant digits, of the address and shaft position information are compared in the subtractor 246 and generates a "Run Fast" signal only upon the presence of a binary "1" in the last 11 digits of the digital output from subtractor 246. If a binary "1" appears in the output of the subtractor during the last 11 output digits, indicating that a substantial difference still exists between the "address" information and the actual shaft position information, the "Run Fast" channel 269 produces a "Run Fast" output signal to increase the speed of the tape drive motor and reduce the difference between the actual tape and shaft position and the desiral location or "address" more rapidly. When the tape has been moved so that it approaches the desired "address," the difference between the actual tape position and the desired "address" appears only in the last three, or least significant figures, of the digital output and no further impulses are supplied through the "AND" gate 270, reducing the speed of the motor so that channel 265 alone controls the motor to provide the final positioning of the tape.

A vernier position encoder 274 mounted on the drive shaft 173 is provided to produce a final positioning and centering of the tape whenever the output from the serial subtractor 246 goes to zero, indicating that the tape transport mechanism has substantially positioned the tape at the address desired. The vernier encoder 274 consists of a coded track 275, a plurality of conductive segments 276 separated by insulating segments 277. A brush 278 makes sliding contact with the conducting and non-conducting segments 276 and 277 and is conected to the output of the "AND" gate 270, which supplies an energizing potential to the vernier device during the last 11 digits of the information stored in the registers. The track 275 is connected to the "OR" gate 266 in the motor signal generating channel 265 to supply a Final Run signal to position the tape in its center position. That is, whenever the output of the serial subtractor 246 goes to zero, indicating that the tape has been substantially positioned in the desired "address" position, if the brush 278 is positioned on one of the conducting segments 276, a negative voltage is applied to the "OR" gate 266, triggering the one shot multivibrator 267 and supplying the Run signal to the motor, which drives the shaft until the brush 278 makes contact with one of the insulating segments 277. No subsequent pulses are supplied to chanel 265 and the motor circuit becomes quiescent. In this manner, the vernier circuit 274 always drives the motor 49 until the brush 278 rests on one of the insulating segments 277 insuring that the tape locations or "addresses" are perfectly aligned and centered.

The shaft position encoder illustrated generally at 43 consists of a plurality of coded disks, mounted on the sprocket wheel drive shaft 173, each of which includes a plurality of conducting tracks and associated brushes which convert the analog shaft position to an output in digital form. Digital shaft position encoders of this type are well known in the art and commercially available, and hence will not be described in detail here. One such analog to digital shaft position encoder is manufactured by the Norden-Ketay Corporation and a description of the construction and manner of operation of such an encoder is described in "Analog-Digital Conversion Techniques," Massachusetts Institute of Technology, Summer Session, 1956, published by M.I.T. Photoservice, Cambridge, Mass., and particularly in Section 6.33 thereof. In addition, a similar encoder device is described and shown on pages 473–476 of Digital Computer Components and Circuits—Richards, (1957) D. Van Nostrand Company, Inc., New York. Reference is hereby made to these two texts for a detailed description of an encoding device which may be utilized with the instant invention to provide parallel digital output representative of the shaft position.

Figure 15:
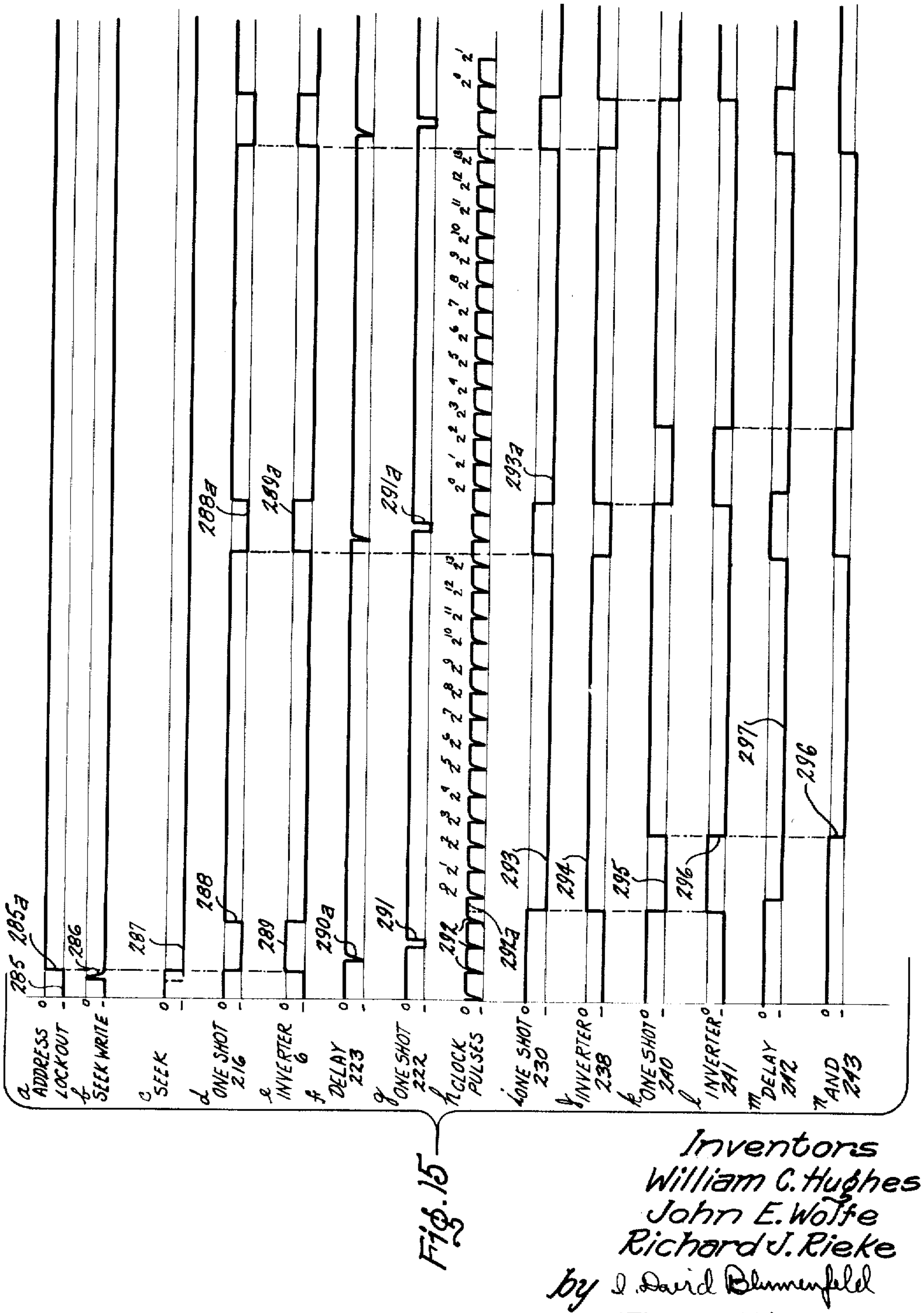
FIGURE 15 illustrates the timing wave forms in the various portions of the circuit of FIGURE 14.

Operation of the address register circuit illustrated in FIGURE 14 may best be understood by reference to FIGURE 15 which illustrate the timing signal wave forms produced in timing circuit 52. Thus initially, during the period that serial "address" information from the external circuit or computer is supplied through "AND" gate 280 and the "OR" gate 237 to the shift register 42, the "AND" gate 280 receives a negative enabling signal 285 from the control circuit 55 which appears at the input terminal 192 of FIGURE 14. This enabling signal at terminal 192 is also applied to the clock input "AND" gate 281 which transmits clock pulses from the computer clock generator, "OR" gate 235 to the register 42. After the 14 digit "address" information has been entered in register 42, a SEEK WRITE or SEEK READ pulse 286, shown in FIGURE 15*b*, is supplied from the computer. The SEEK WRITE or SEEK READ pulse 286 operates a relay circuit which supplies a negative SEEK voltage 287 which is supplied to the input terminal 213 of the timing circuit 52. Simultaneously, enabling voltage 285 for the "AND" gates 280 and 281 goes positive, as indicated by the positive going pulses front 285*a*, closing gates 280 and 281 and preventing further serial address or clock input pulses from being transmitted through these gates to the shift register 42.

The SEEK signal is delayed slightly by the delay circuit 214 and applied to the input of the "OR" gate 215 triggering the one shot multivibrator 216 and producing the negative output pulse 288 shown in FIGURE 15*d*. The negative pulse 288 from the one shot 216 is also supplied to an inverter 217, which inverts its polarity to produce a positive pulse 289, which is applied to the various "AND" gates 45*a* of the shift register 45 to isolate the flip flops 45*f*. The output pulse 288 from one shot 216 is transmitted through a delay circuit 223, and differentiator 284 and "OR" gate 224 as a delayed reset pulse 290 to clear the register 45 by returning all of the flip flops 45*f* in the register to their binary "0" condition prior to the application of the information on the shaft addition encoder. The negative pulse 288 from one shot 216 is transmitted through delay circuit 221 to one shot multivibrator 222 which triggers to produce a negative energizing output pulse 291 for the encoder 42. The time constant of delay circuit 221 is greater than that of delay circuit 223 so the encoder energizing pulse 291 always occurs later than the reset pulse 290 which clears the register 45 so that the shift register 45 is always cleared before the 14 digit shaft position signal from the encoder 43 is stored. The shaft encoder energizing pulses 291 always occurs during the positive ISOLATING pulse 289 for "AND" gates 45*a* so that these gates are disabled during the period when shaft position information is supplied to their associated flip flops 45*f*.

The positive pulse 289 from inverter 217 is also supplied to the "AND" gate 227 to close this gate until the pulse terminates, at which time its negative back edge is transmitted through the gate 277 to the "AND" gate 299. "AND" gate 229 also receives clock pulses 292, shown in FIGURE 15*h*, from the clock pulse generator 231 so that the first delayed clock pulse 292*a* that appears after the output from inverter 217 goes negative is transmitted by "AND" gate 229 to the one shot 230. This pulse 292*a* is delayed by the circuit 232 by one half the period between clock pulses so that the one shot 230 is always triggered between pulses 292 to produce a negative pulse 293, shown in FIGURE 15*i*. This negative pulse opens clock pulse gate 234 which now transmits clock pulses from the generator 231 to the registers 42 and 45.

The duration of pulse 293 from one shot 230 is such that 14 clock pulses pass through the gate 234 to the shift registers and the entire "address" and shaft position information is read out of the registers to the serial subtractor 246 which produces an output representative of their difference. At the end of this period, the one shot 230 reverts to its normally stable condition terminating the pulse and closing the "AND" gate 234 and preventing further clock pulses from going to the shift registers.

The negative pulse 293 from the one shot 231 is also supplied over the conductor 233 to open "AND" gate 236 so that the information stored in the address shift register 42 is recirculated through "OR" gate 237 to the input of register 42. That is, while the information from the address register 42 is transmitted through the switching circuit 245 for comparison in the serial subtractor 246, this information is concurrently fed back to the input of the shift register, so that at the end of the 14 clock pulses from the clock pulse generator 231 the "address" information is again stored in the register 42, and ready to be compared with the new shaft information in the register 45.

In addition, the output from the one shot multivibrator 230 is applied to the inverter circuit 238 where the polarity is inverted so that the negative pulse 293 is converted to the positive going pulse 294 of FIGURE 15*j*. The positive pulse 294 closes "AND" gate 260 and prevents the passage of any "borrow" pulses from flip flop 264 to the switch reversing flip flop 255. At the end of 14 clock pulses, the pulse 294 terminates and the output of inverter 238 becomes negative conditioning the gate 260 to pass a binary "1" "borrow" signal to the reversing flip flop 255 if the output of the serial subtractor is negative.

The output from the inverter 238 is also fed back to the "AND" gate 229 which controls the one shot 230 to prevent further clock pulses from the clock pulse generator from passing through this gate to one shot 230.

Negative pulse 293 from one shot 231 is supplied through a delay circuit 242 to the input of "AND" gate 243 and concurrently to a one shot multivibrator 240.

One shot 240 produces a negative pulse 295 lasting three clock pulses. Pulse 295 is applied to an inverter 241 to produce a corresponding positive pulse 296. Pulse 296 is fed to "AND" gate 243 opening the gate and preventing the negative pulse 293 from passing through this gate to the "Run Fast" "AND" gate 270 during readout of the first three digits. Delay circuit 242 introduces a sufficient delay of the pulse 293 to prevent it from inadvertently going through the "AND" gate 243 before the inhibiting pulse 296 from inverter 241 is applied. The delayed pulse 293 from delay circuit 241 is illustrated at 297 of FIGURE 15*m* or cannot pass through the gate 243 until the positive pulse 296 from the inverter 241 is terminated, at which time a negative pulse 296 is transmitted through "AND" gate 243 to the "AND" gate 270 opening the gate to the output pulses from serial subtractor 246 to energize the "Run Fast" channel 269. Thus, the portion of the timing circuit 52 comprising the one shot 240, the inverter 241, "AND" gate 243, and delay circuit 242 functions to provide an enabling voltage for the "Run Fast" channel "AND" gate 270 during the last 11 digits supplied from the shift registers to the subtractor 246 so that the "Run Fast" channel is energized only if the difference between the shaft position information and the "address" information is large.

After 14 clock pulses 292 have been transmitted to the shift registers, the positive pulse 294 from the inverter 238 goes negative and opens an "AND" gate 239 which also receives the SEEK signal 287 from the delay circuit 214. The concurrent presence of the SEEK signal 287 and the negative going pulse front of pulse 294 opens gate 239 transmitting a negative going pulse through "OR" gate 215 to the one shot 216. This negative pulse triggers the one shot 216 and produces at its output a second negative pulse 288*a*. The second negative pulse 288*a* is again transmitted through delay 223, differentiator 284 and the "OR" gate 225 to the reset bus 226 of the shaft position information register 45 to clear it of any previously stored information. Similarly, pulse 288*a* is transmitted through delay 221 to one shot 222 to produce an encoder energizing pulse 291*a* supplying new shaft position information to the register 45, after a positive pulse 289*a* from the output of the inverter 217 has isolated the individual stages 45*f* of the shift register. After the new shaft position information has been entered and the positive pulse 289*a* from the inverter 217 has terminated, "AND" gates 227 and 229 are opened actuating one shot 230 to produce a negative pulse 293*a* which opens gate 234 so that clock pulses are transmitted to the two shift registers to repeat the readout and comparison of the information in "address" registers 42 and the new shaft position information in register 45. A new digital output signal is produced from the subtractor 246 which is representative of the new difference between the address information and the shaft position.

The entire cycle is repeated again and again until the tape has been positioned at the desired address, at which time energization of the shaft position encoder provides a 14 digit output signal which is identical to the 14 digit address signal in the shift register 45, and the output of the serial subtractor 246 goes to zero. Consequently, no energizing digital pulses are supplied to either the "Run" or the "Run Fast" channels 265 and 269. If, however, the final position of the shaft is such that the brush 278 of the vernier encoder 274 is positioned on one of the conducting segments 276, indicating that the tape is not perfectly centered, a voltage is supplied to "OR" gate 266, triggering the multivibrator 267 and providing a "Run" signal to the motor, which drives it until the brush 278 moves onto one of the insulating segments 277. At this time, the output from the "Run" channel 265 goes to zero and remains there, changing the condition of its associated relays to deenergize the tape drive motor and close a contact in the circuit of an ADDRESS-LOCATED relay.

Energization of this ADDRESS-LOCATED relay causes an ADDRES-LOCATED signal to be transmitted to the computer, which thereupon transmits the information to be recorded to the beam writer writing mechanism, or enables the readout circuit by switching on the light source. After the reading or writing has taken place, the computer supplies a READ-WRITE finished signal which disables the ADDRESS-LOCKOUT signal generating circuit, applying a negative enabling potential to the input terminal 192 and the "AND" gates 280 and 281 as well as removing the negative SEEK signal applied to the input terminal 213 of timing circuit 52. The circuit is again ready to receive new address information from the computer in order to position the tape in any randomly chosen location or "address" to which access is desired. The entire operation of the address circuit is then repeated to locate the new tape address.

From the foregoing description it can be appreciated that the instant invention provides an information storage system for storing large quantities of information on a thermoplastic storage medium in such a manner that any randomly chosen site or sites on the storage medium may be located with equal facility to store or retrieve the information. The system is therefore highly advantageous in that both high storage density and short access time are concurrently provided. Moreover, by providing optical readout for retrieval of the stored information the speed of the system is further enhanced since the output information may be viewed directly and immediately without further manipulation.

While a particular embodiment of this invention has been shown it will, of course, be understood that the invention is not limited thereto since many modifications both in circuit arangement and in the instrumentalities employed may be made, it is contemplated by the appended claims to cover any such modifications as fall within the true spirit and scope of the invention.

What we claim as new and desire to secure by Letters Patent of the United States is:

1. A new and improved random access library storage analog recording and readout system including in combination electron writing means for writing an entire page of information to be stored in analog form on a selected location of a solid impressionable thermoplastic film recording medium, heating means for heating the thermoplastic film recording medium subsequent to the electron writing to thereby permanently record in analog form the page of information to be stored by the production of permanent deformations formed in the thermoplastic film recording medium, radiant energy readout means for illuminating an entire page of information thus recorded in analog form and retrieving the information in the form of a spatial radiant energy image produced by the deformations in the thermoplastic film recording medium, and random access transport means for positioning any randomly selected storage location on the thermoplastic film recording medium at said electron writing means to record information or at said radiant energy readout means to retrieve information previously recorded, said random access transport means including a drive means to transport the thermoplastic film recording medium in two opposite directions, and drive control means adapted to receive site selection information and actuate the drive means in response thereto to accurately position a selected location on the thermoplastic film recording medium either at the electron writing means or the radiant energy readout means.

2. In a system for storing information on a thermoplastic film recording medium at a plurality of discrete, identifiable sites, the combination comprising electron beam writing means for impressing electrons directly on said thermoplastic film recording medium in information conveying patterns to form corresponding deformation patterns, means to control the electron beam in one plane to produce deformations in one direction on said thermoplastic film recording medium and means to modify the electron beam in another plane to produce deformations which are orthogonal to the deformations in said one direction, optical readout means for retrieving information from said deformation patterns in the form of projected spatial light images, and random access transport means for positioning any randomly selected storage site on said thermoplastic film recording medium at said beam writing or optical readout means in response to site selection signals supplied to said transport means, said random access transport means including a drive means for moving said thermoplastic film recording medium in either one of two opposite directions to position a selected site on the thermoplastic film recording medium under either said beam writing or said optical readout means, means to produce a signal from said drive means for indicating the actual position of said recording medium, comparison means for comparing the recording medium position signal and site identification information to produce an output signal to energize the drive means and transport the thermoplastic film recording medium until the site identified by said last-named signal is positioned at the beam writing or readout means.

3. The combination of claim 2 in which the electron beam is controlled in one plane in response to two color input signals and is modified in another plane in response to a third color input signal to produce three color orthogonal deformations.

4. In a system for storing information in the form of a three-color system the combination comprising electron beam writing means for impressing electrons directly upon a solid impressionable thermoplastic film storage medium in information conveying patterns to form orthogonal deformations on said storage medium, optical readout means for retrieving information from said orthogonal deformations in the form of projected spatial light images by the addition of three colors including means to project light through said deformations to produce two colors from one portion of said deformations and the third color from the deformations orthogonal to said one portion, and random access transport means for positioning any randomly chosen location on said impressionable thermoplastic film storage medium at said beam writing or optical readout means in response to an input signal identifying said location, said random access transport means including a reversible drive means for moving said thermoplastic film recording medium in either one of two opposite directions in order to position a selected location under the electron beam writing means or the optical readout means, means for producing and storing a digital signal indicating the actual position of the thermoplastic film recording medium, storage means adapted to receive digital address signals identifying the location on the thermoplastic film recording medium to be transported to either said electron beam writing means or said optical readout means, and comparator means adapted to receive said digital location position and address signals for producing an output signal to energize said drive means and transport the thermoplastic film recording medium until the output from the comparator goes to zero and the location identified by said address signal is positioned at either the electron beam writing means or the optical readout means.

References Cited in the file of this patent

UNITED STATES PATENTS

| | | |
|---|---|---|
| 2,777,745 | McNaney | Jan. 15, 1957 |
| 2,782,398 | West | Feb. 19, 1957 |
| 2,923,921 | Shapin | Feb. 2, 1960 |
| 2,985,866 | Norton | May 23, 1961 |